June 22, 1926.

F. M. CASE

NAIL KNOB ASSEMBLY

Filed April 17, 1922    23 Sheets-Sheet 1

1,589,939

Witnesses.
Edward T. Wray
L. A. Millbrook

Inventor.
Francis M. Case.
by Parker & Carter
Attorneys.

June 22, 1926.

F. M. CASE 1,589,939

NAIL KNOB ASSEMBLY

Filed April 17, 1922  23 Sheets-Sheet 11

June 22, 1926.

F. M. CASE 1,589,939

NAIL KNOB ASSEMBLY

Filed April 17, 1922    23 Sheets-Sheet 12

Witnesses.
Edward T. Wray
L. A. Millbrook

Inventor:
Francis M. Case.
By Parker & Carter
Attorneys.

June 22, 1926.
F. M. CASE
NAIL KNOB ASSEMBLY
Filed April 17, 1922
1,589,939
23 Sheets-Sheet 13
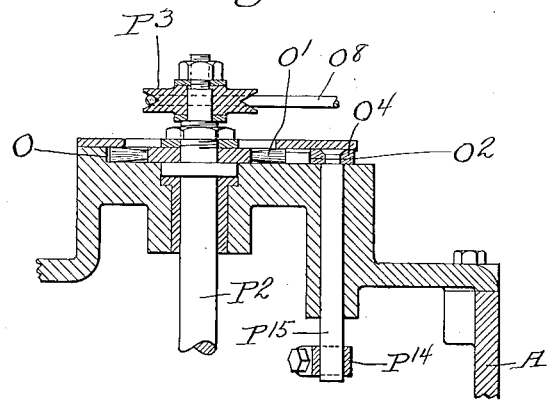
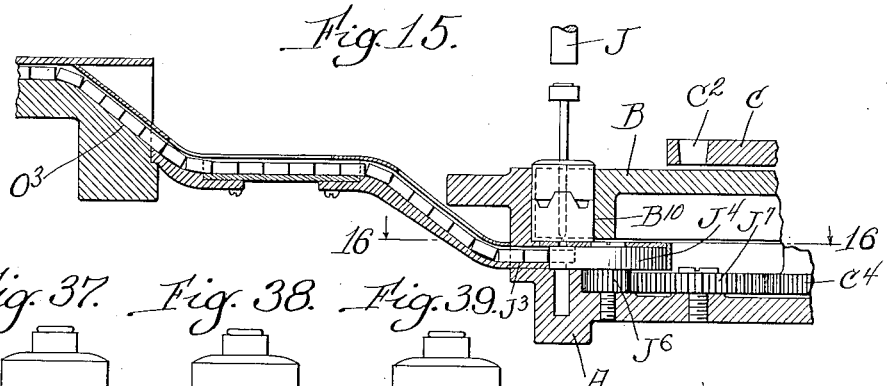
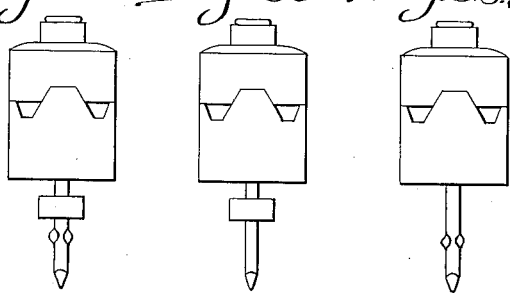
Witnesses.
Edward T. Wray.
L. A. Millbrook
Inventor.
Francis M. Case.
by Parker & Carter
Attorneys.

June 22, 1926.

F. M. CASE 1,589,939

NAIL KNOB ASSEMBLY

Filed April 17, 1922   23 Sheets-Sheet 14

Witnesses.
Edward T. Wray.
L. A. Millbrook

Inventor.
Francis M. Case
by Parker & Carter
Attorneys

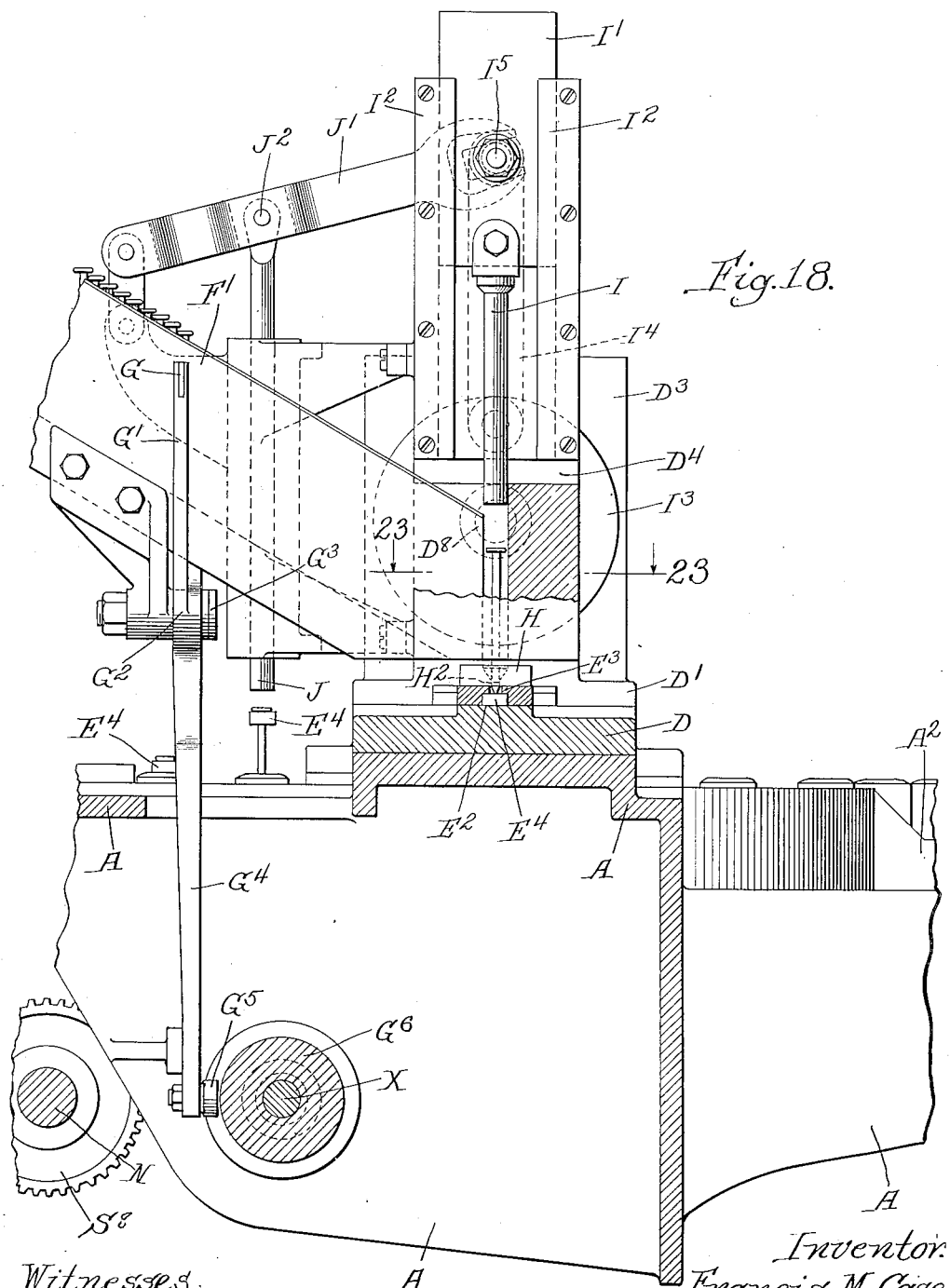

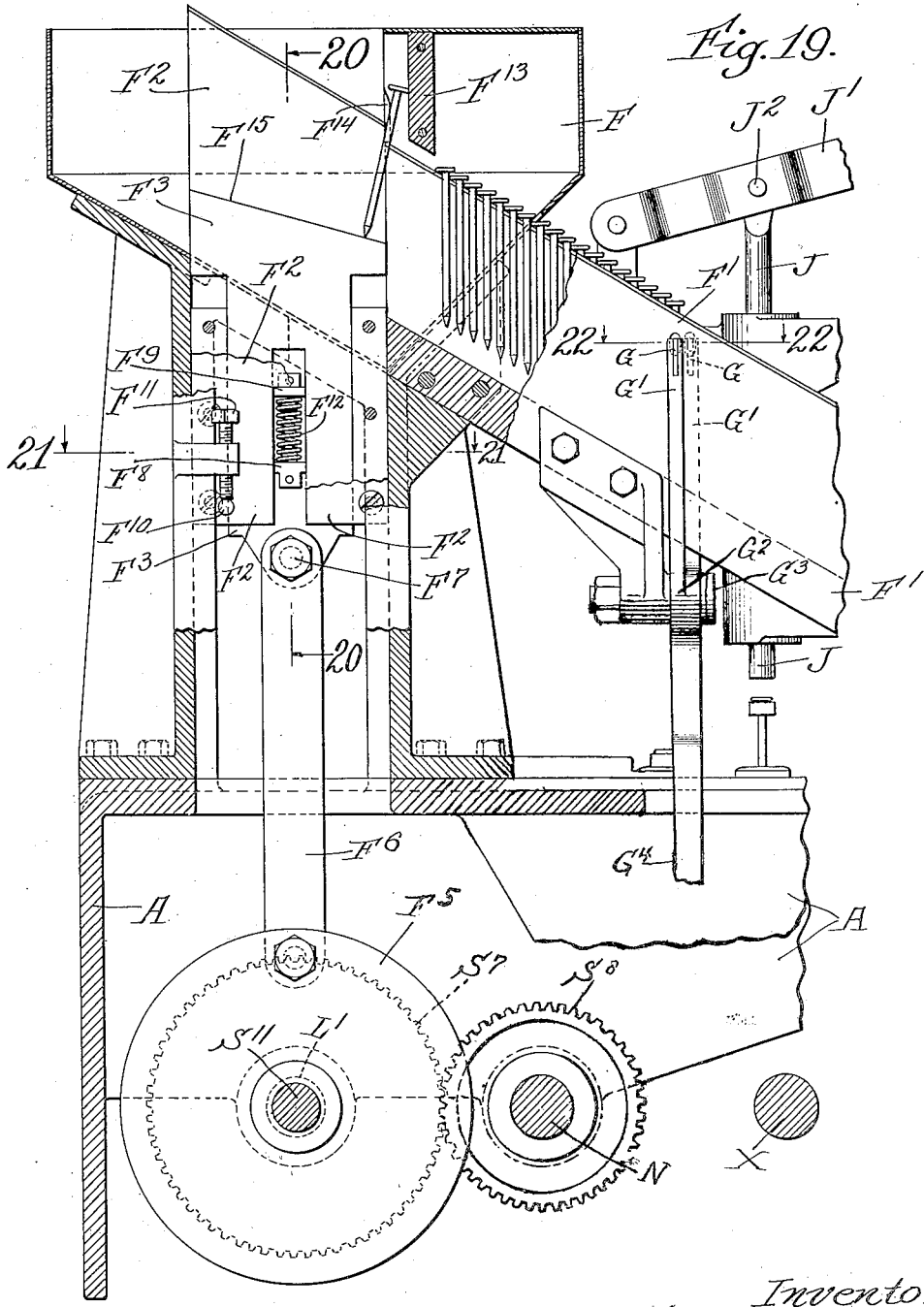

June 22, 1926.
F. M. CASE
NAIL KNOB ASSEMBLY
Filed April 17, 1922
1,589,939
23 Sheets-Sheet 17
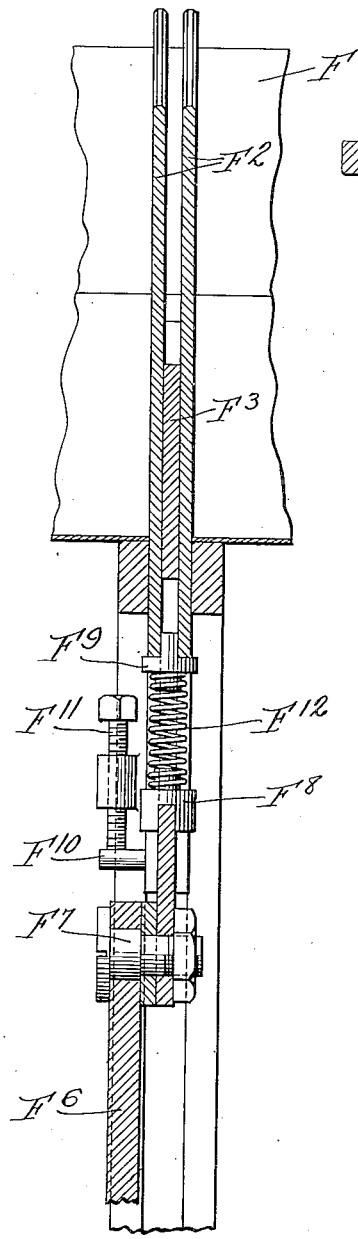
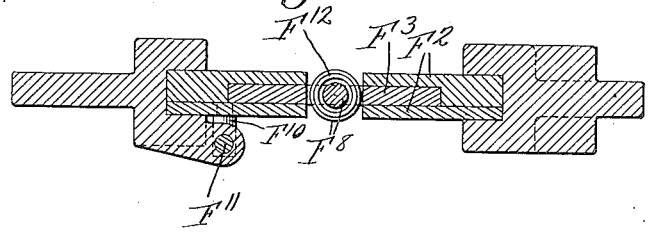
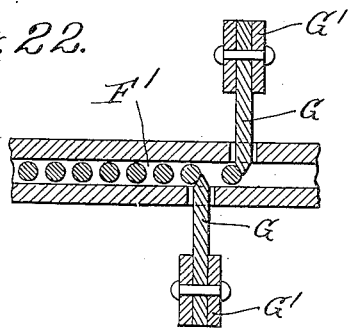
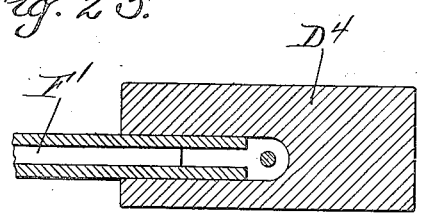
Witnesses
Edward T. Wray.
L. A. Millbrook
Inventor:
Francis M. Case.
by Parker & Carter
Attorneys.

June 22, 1926.
F. M. CASE
1,589,939
NAIL KNOB ASSEMBLY
Filed April 17, 1922   23 Sheets-Sheet 18
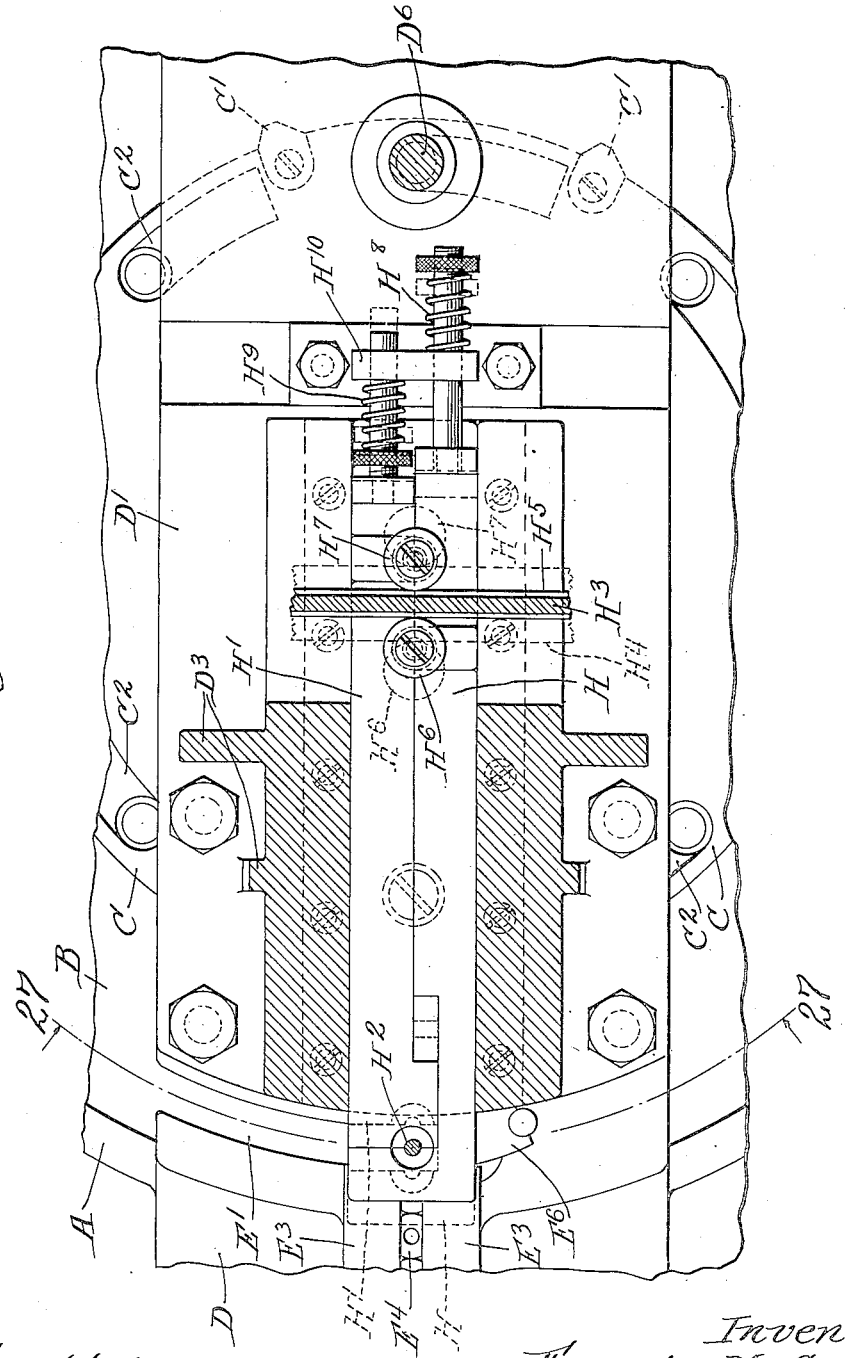

June 22, 1926.

F. M. CASE

NAIL KNOB ASSEMBLY

Filed April 17, 1922    23 Sheets-Sheet 19

1,589,939

Witnesses
Edward T. Wray
L. A. Millbrook

Inventor.
Francis M. Case.
by Parker & Carter
Attorneys.

June 22, 1926.

F. M. CASE

NAIL KNOB ASSEMBLY

Filed April 17, 1922

Witnesses
Edward T. Wray
L. A. Millbrook

Inventor
Francis M. Case
by Parker & Carter
Attorneys.

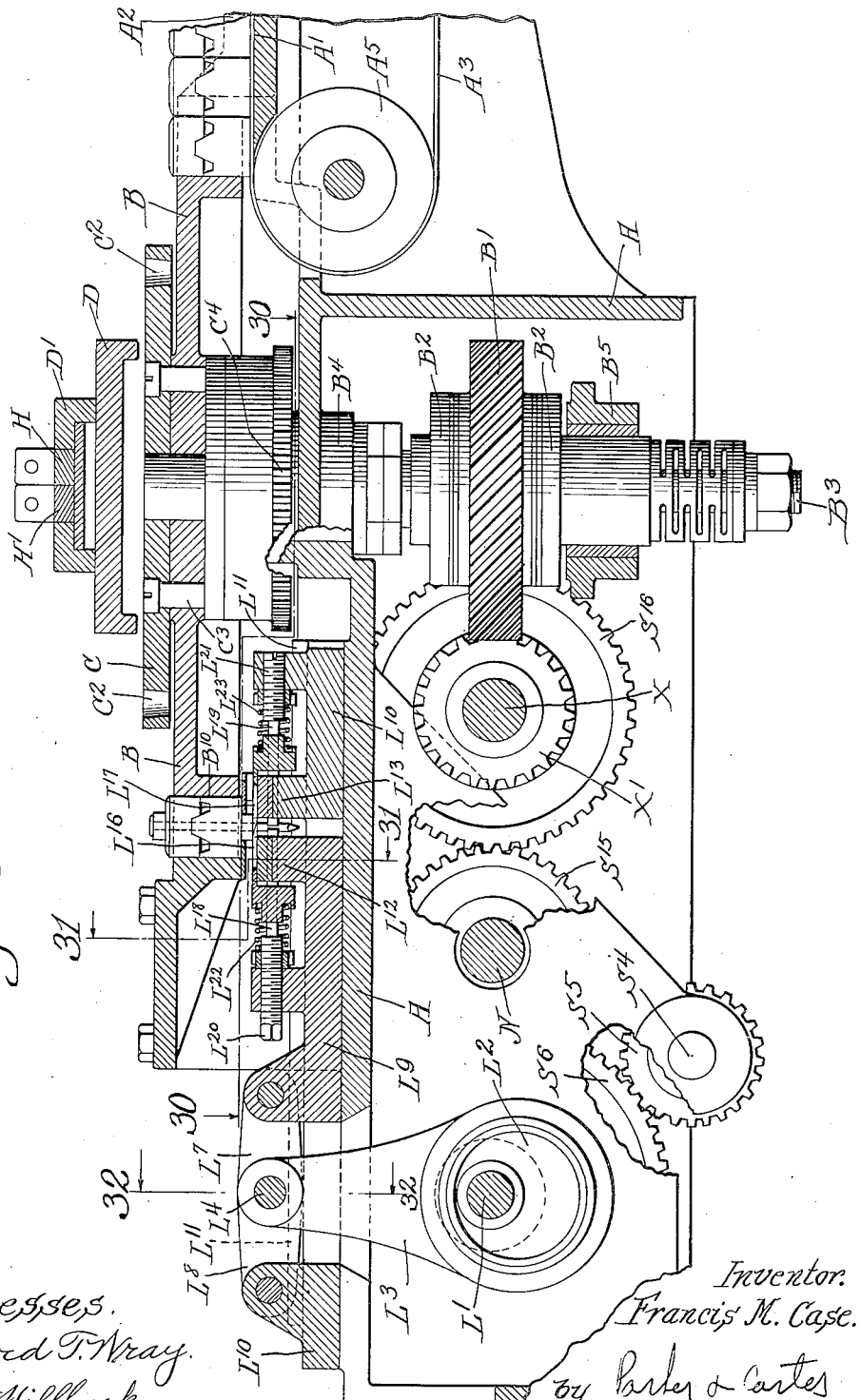

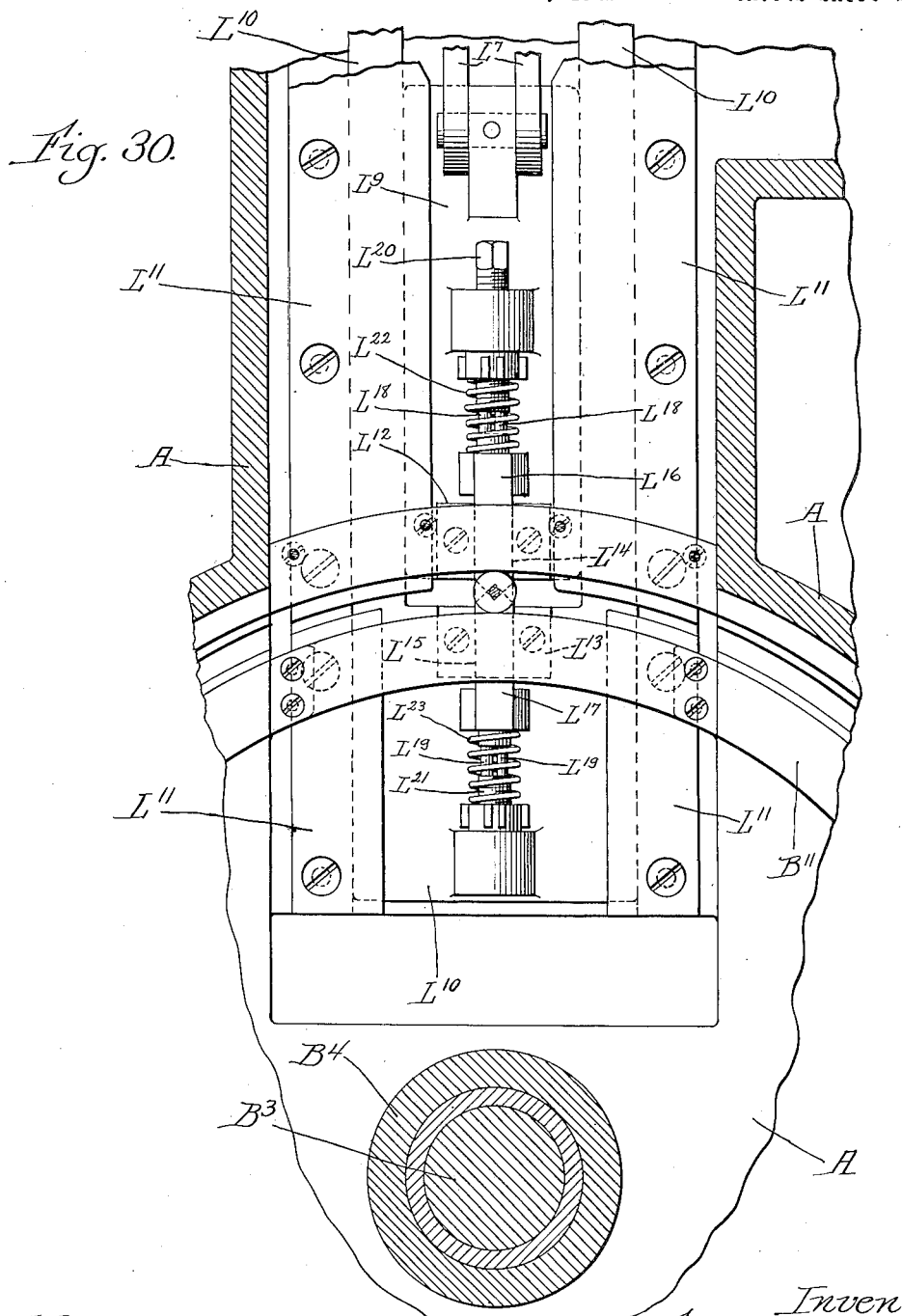

June 22, 1926.
F. M. CASE
NAIL KNOB ASSEMBLY
Filed April 17, 1922     23 Sheets-Sheet 23
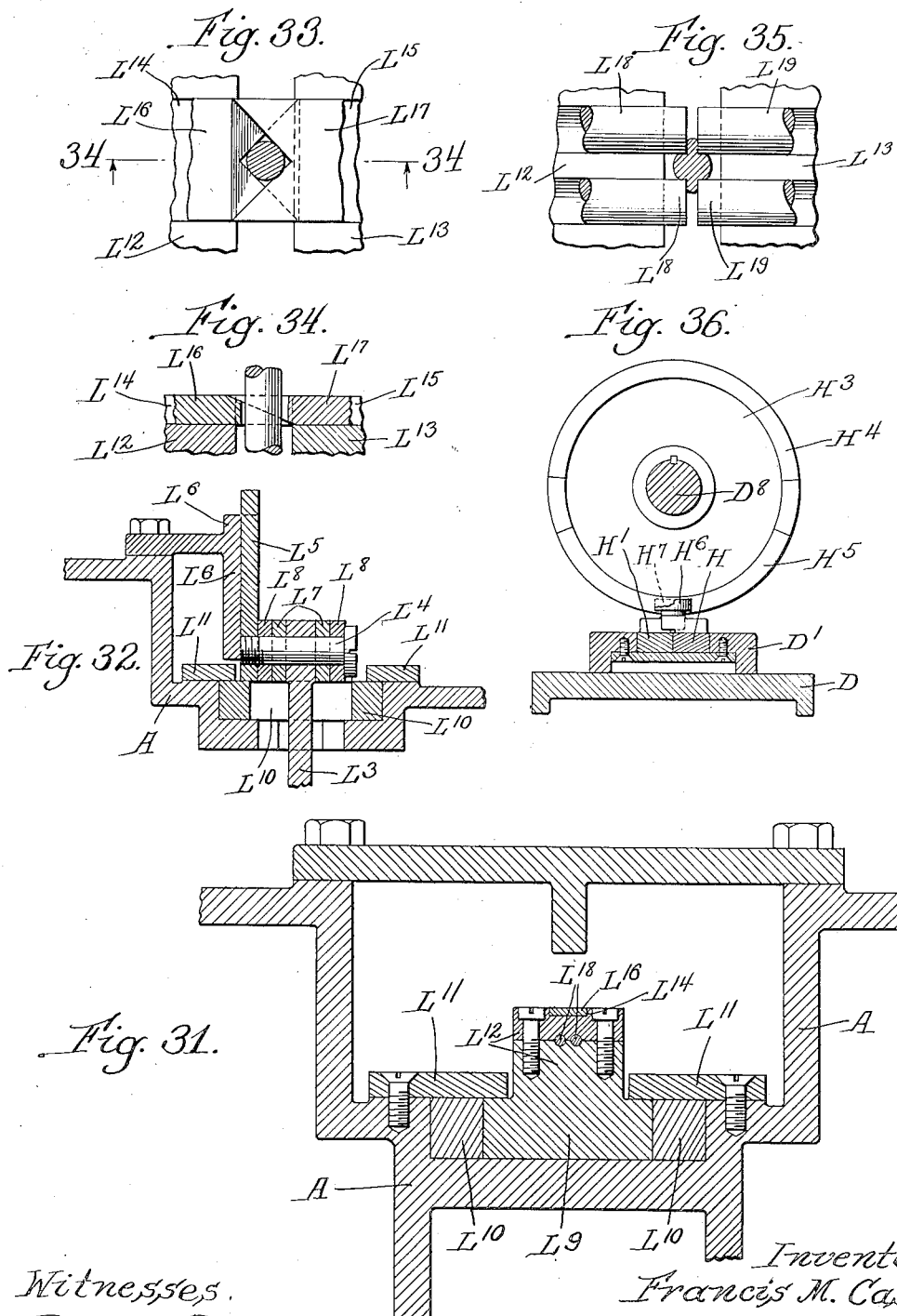

Patented June 22, 1926.

1,589,939

UNITED STATES PATENT OFFICE.

FRANCIS M. CASE, OF CLEVELAND, OHIO, ASSIGNOR TO FEDERAL PORCELAIN COMPANY, OF CAREY, OHIO, A CORPORATION OF OHIO.

NAIL-KNOB ASSEMBLY.

Application filed April 17, 1922. Serial No. 553,477.

My invention relates to a machine for preparing nail knobs, and particularly to a machine wherein a pair of opposed porcelain knobs are mounted upon a nail, with or without holding or protecting washers. Another purpose is to provide a machine for assembling such nail knobs upon the nail and for crimping or otherwise enlarging or deforming the nail beneath the knobs to keep them permanently in place upon the nail. This operation is completely automatic. Other purposes will appear from time to time in the course of the specifications.

I illustrate my invention more or less diagrammatically in the accompanying drawings, wherein—

Fig. 14 is a section along the line 14—14 of Fig. 6;

Fig. 15 is a section on the line 15—15 of Fig. 4;

Fig. 18 is a section along the line 18—18 of Fig. 4;

Fig. 19 is a section along the line 19—19 of Fig. 5;

Fig. 20 is a section along the line 20—20 of Fig. 19;

Fig. 21 is a section along the line 21—21 of Fig. 19;

Fig. 22 is a section along the line 22—22 of Fig. 19;

Fig. 23 is a section along the line 23—23 of Fig. 18;

Fig. 24 is a section along the line 24—24 of Fig. 7;

Fig. 29 is a section along the line 29—29 of Fig. 1;

Fig. 30 is a section along the line 30—30 of Fig. 29;

Fig. 31 is a section along the line 31—31 of Fig. 29;

Fig. 32 is a section along the line 32—32 of Figs. 5 and 29;

Fig. 33 is a detail plan of the nail locating fingers of the crimping mechanism shown in Fig. 29;

Fig. 34 is a detail section along the line 34—34 of Fig. 33;

Fig. 35 is a detail plan view of the crimping plungers;

Fig. 36 is a section along the line 36—36 of Fig. 7;

Fig. 37 is a side view of the assembled knob, washers and nail;

Fig. 38 is a similar view omitting the crimping of the nail;

Fig. 39 is a similar view with only one washer and nail crimped.

Like parts are indicated by like letters and numbers throughout the various specifications and drawings.

Figure 3:
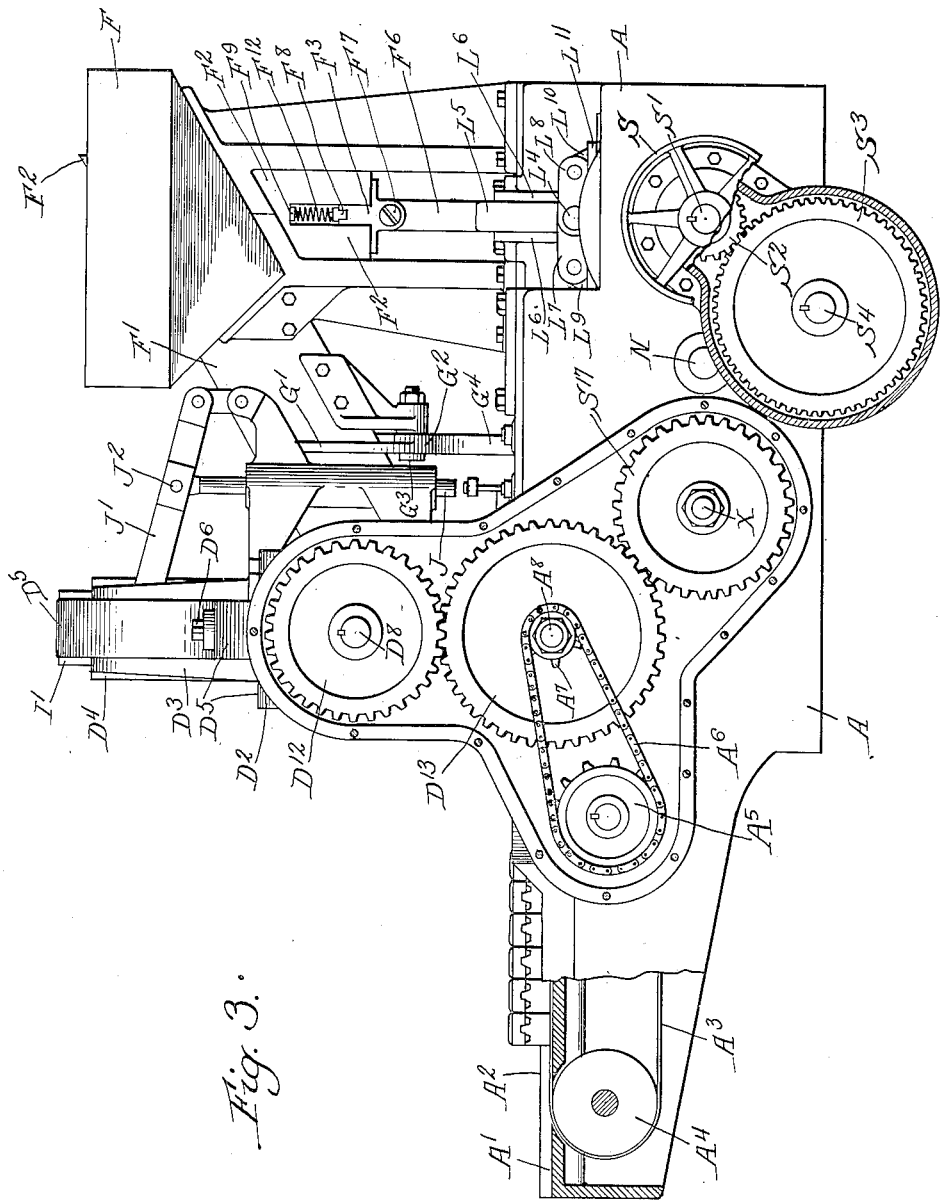
Fig. 3 is an elevation of one end of the machine, with parts removed and parts broken away.
Figure 4:
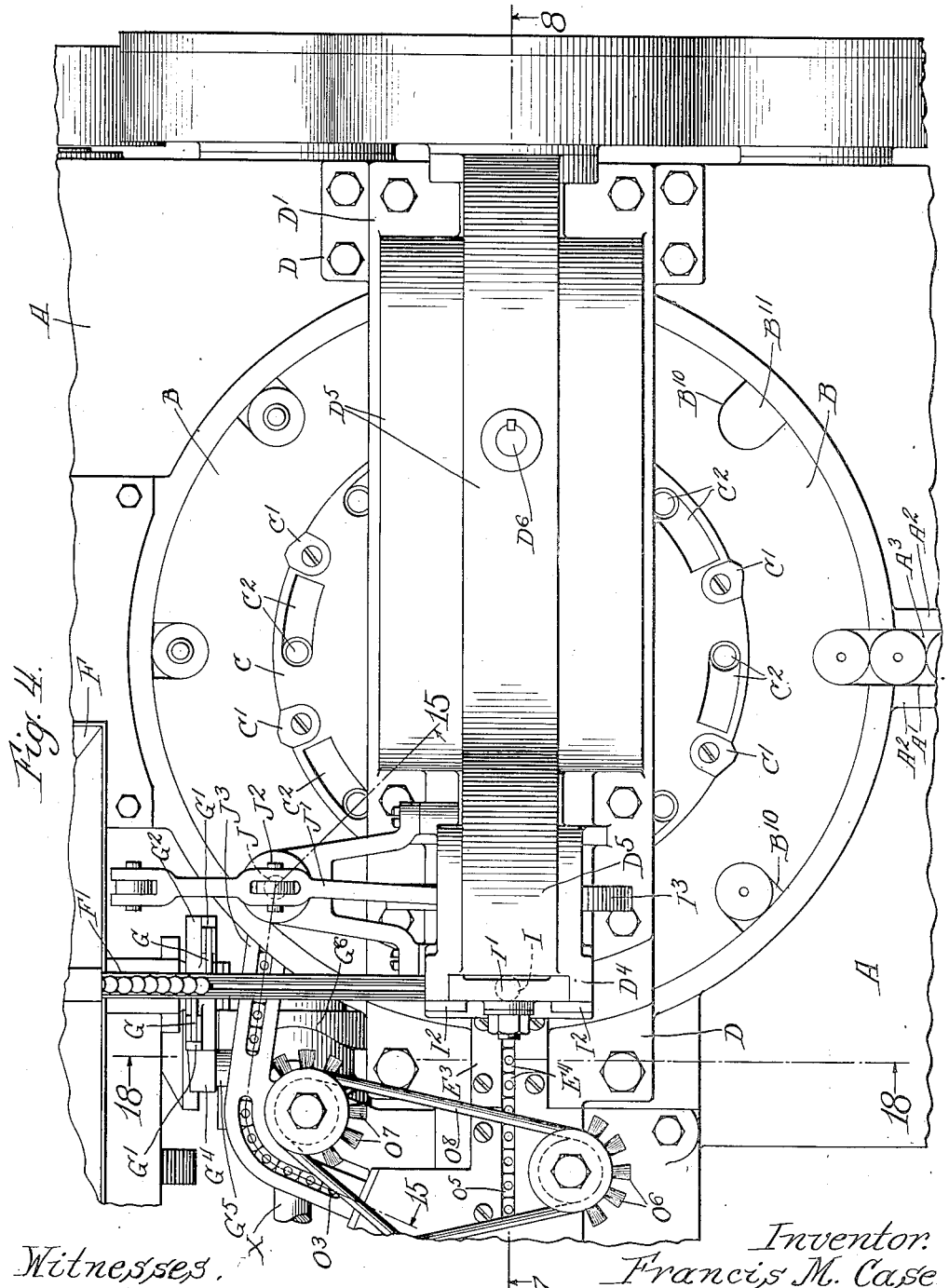
Figs. 4, 5 and 6 are partial plan views with parts broken away.

A is a machine bed, preferably formed of a single casting, which may be supported upon any suitable framework, which is not described in detail herein. It is channeled as at $A^1$ adjacent the front of the machine, shown at the bottom of Fig. 1, and along either side of the channel are raised portions $A^2$ $A^2$. Within and beneath the channel $A^1$ is an endless traveling belt or conveyor $A^3$, upon which porcelain nail knob pairs may be placed for conveyance inwardly from the edge of the machine top. The belt rides about the idler $A^4$ and the pulley $A^5$, which is driven by the sprocket chain $A^6$ and the sprocket $A^7$ on the shaft $A^8$, the further driving connection of which will later be set forth. The belt and its driving mechanism are shown in Figs. 3 and 29.

The porcelain blanks are fitted in pairs, and when placed on the conveyor are carried inwardly toward the carrier table B, which is given an intermittent rotation as follows: The constantly rotating shaft X drives through any suitable gearing, for example a helical gear $X^1$ and the helical gear $B^1$, which is in frictional engagement with the opposed collars $B^2$ $B^2$, which are keyed or otherwise secured to the vertical shaft $B^3$ supported in the upper bearing $B^4$ and guided by the lower bearing $B^5$. The upper portion of the shaft is enlarged, as at $B^6$, and the enlarged portion rides against the upper rim of the bearing $B^4$. The lower end of the shaft $B^3$ is screw-threaded and a nut thereupon holds compressed between it and the lower collar $B^2$ a spring or any suitable yielding means adapted to compress both collars about the gear $B^1$.

Overlying the central portion of the table B is a substantially circular plate C, the periphery of which is provided at frequent intervals with a plurality of outwardly projecting cam surfaces $C^1$ $C^1$. The plate is further provided with a plurality of concentric slots $C^2$ adjacent its periphery, each slot comprising a relatively long concentric portion downwardly inclined from the surface of the plate and ending in a circular aperture therethrough. The plates B and C are further penetrated by opposed apertures in which lie bolts $C^3$ which penetrate both plates and pass through the enlarged portion $B^6$ on the shaft $B^3$, thus pinning the whole assembly together. The bottoms of said bolts are secured to a ring gear $C^4$, the purpose of which will later appear.

Figure 1:
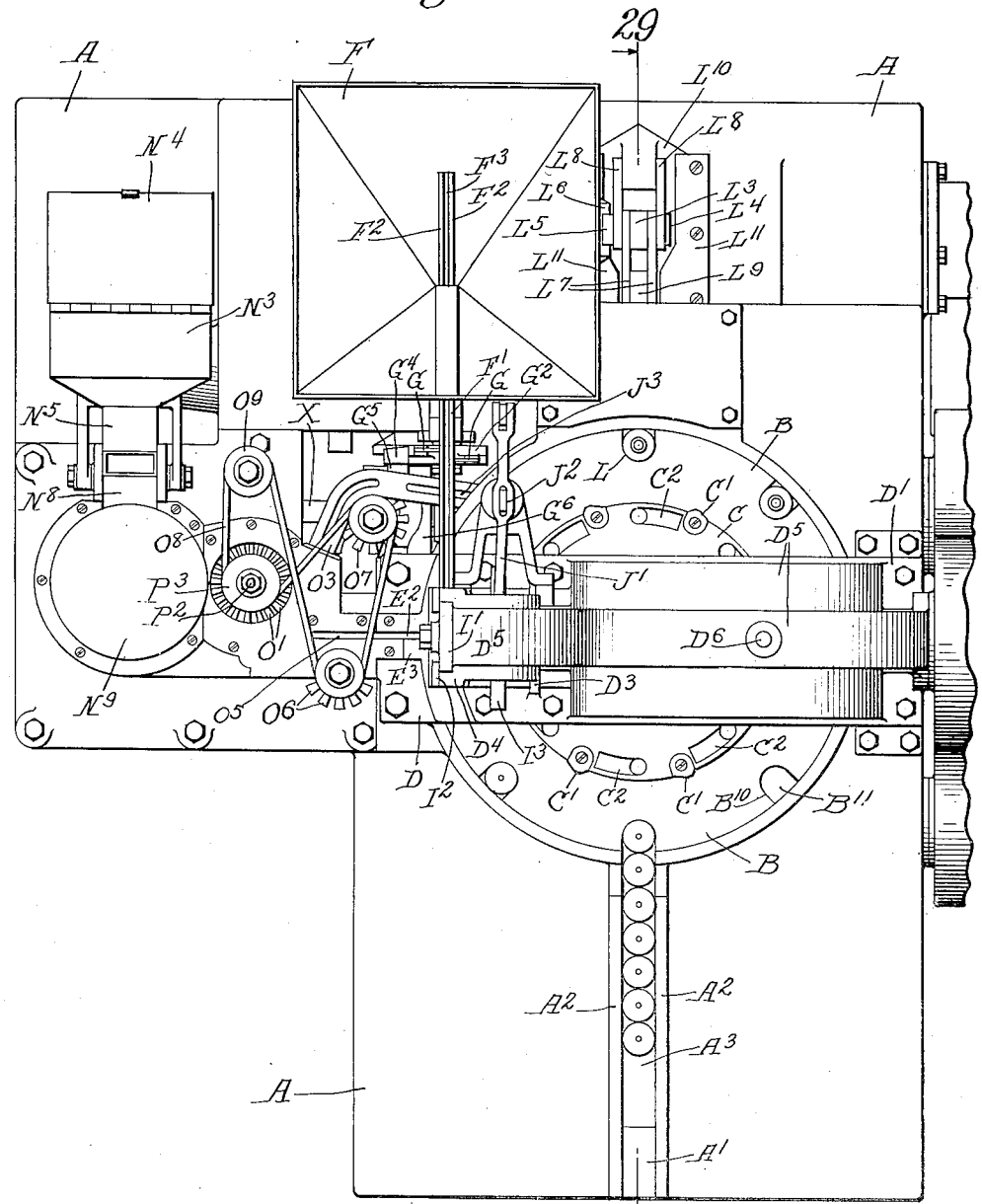
Fig. 1 is a plan view of the entire machine with parts broken away.
Figure 2:
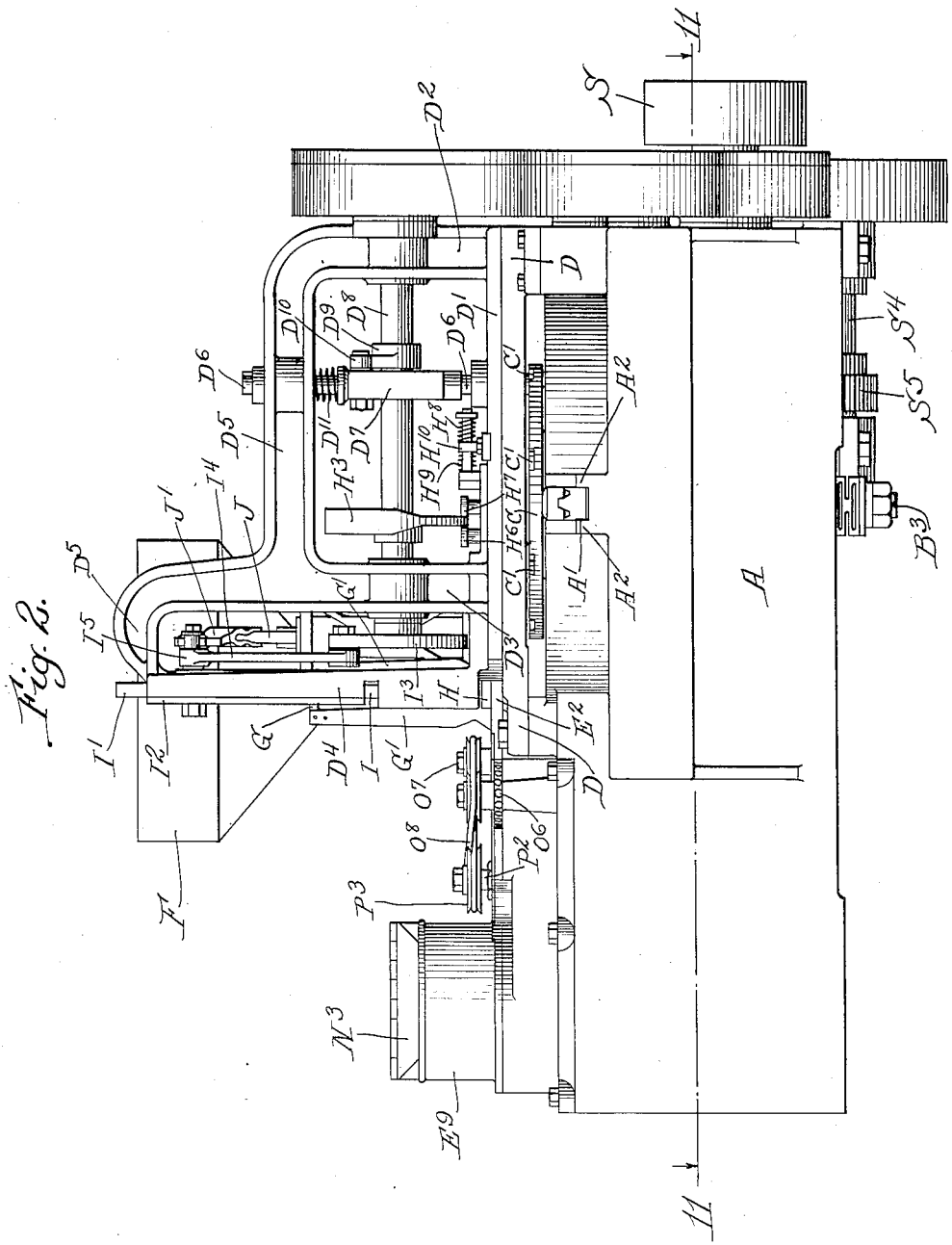
Fig. 2 is a front elevation of the machine.

Overlying the table B is a transverse bridge or plate D, secured at its opposite ends to the bed A. Mounted on the bridge D is the supporting bracket $D^1$, comprising the vertical portions $D^2$, $D^3$ and $D^4$ and the horizontal bridging sections $D^5$. Passing through the bed of the bracket $D^1$, the bridge D and the bridge portion $D^5$, slidable in opposed apertures therein, is the plunger $D^6$. Intermediate the ends thereof is the enlarged slotted portion $D^7$, through which passes a constantly rotating shaft $D^8$. Keyed to this shaft is a cam $D^9$ adapted to engage a roller $D^{10}$ on said slotted portion $D^7$ to raise it against the spring $D^{11}$ intermediate it and the bridge portion $D^5$. The rotation of the shaft $D^8$ thus alternately lifts and drops the plunger $D^6$, the lower end of which is adapted to penetrate the slots $C^2$ in the plate C, to control its revolution with relation to the gear $B^1$ and the collars $B^2$ in frictional engagement therewith. The shaft $D^8$ is driven by the gear $D^{12}$ through the gear $D^{13}$ integral with the sprocket $A^7$ on the stub $A^8$. The result is a substantially step-by-step rotation of the table B. The periphery of this table is provided with a plurality of notches $B^{10}$, each one of which is large enough to receive one pair of superposed nail knobs. The endless conveyor continuously feeds the knobs forward and each step of the table B removes one pair of knobs and conveys them to the left, as shown in Fig. 1, the knobs resting upon the surface $B^{11}$ of the bed A.

Figure 26:
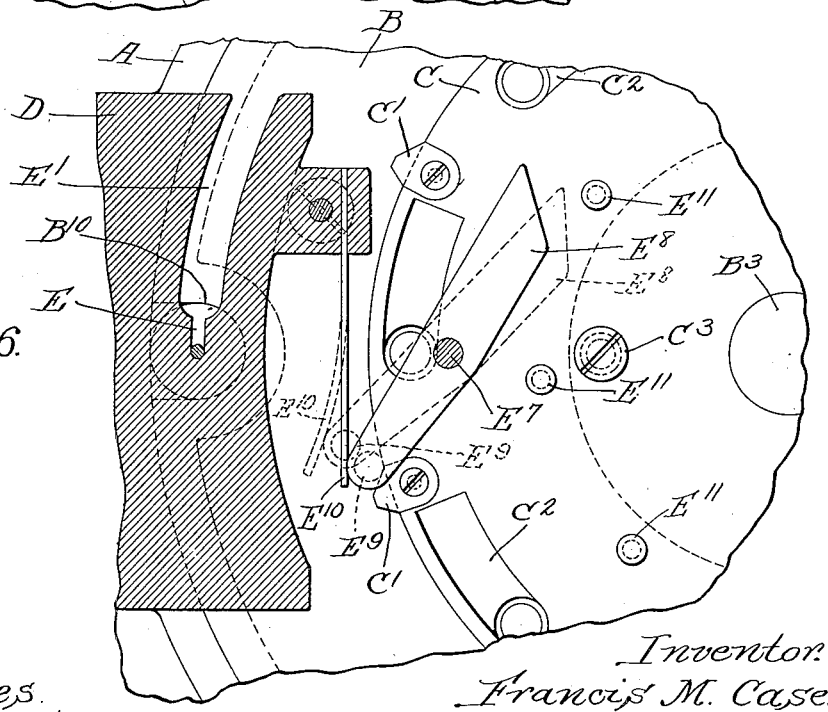
Fig. 26 is a section along the line 26—26 of Fig. 7.
Figure 27:
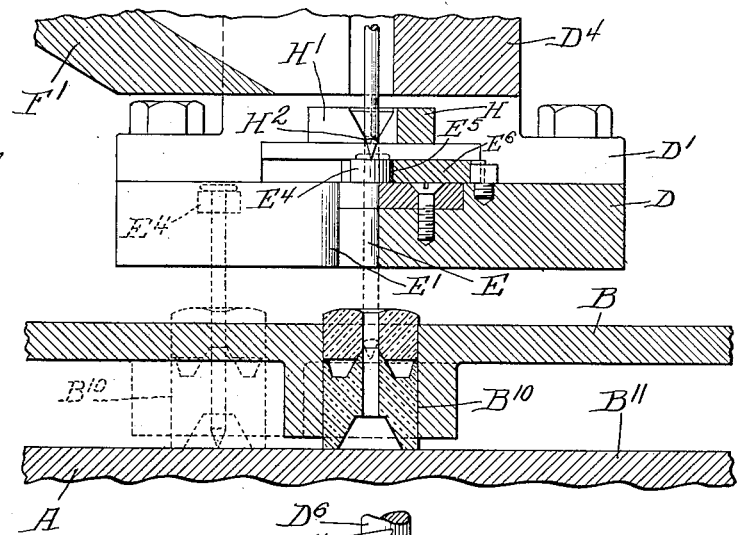
Fig. 27 is a section along the line 27—27 of Fig. 24.
Figure 28:
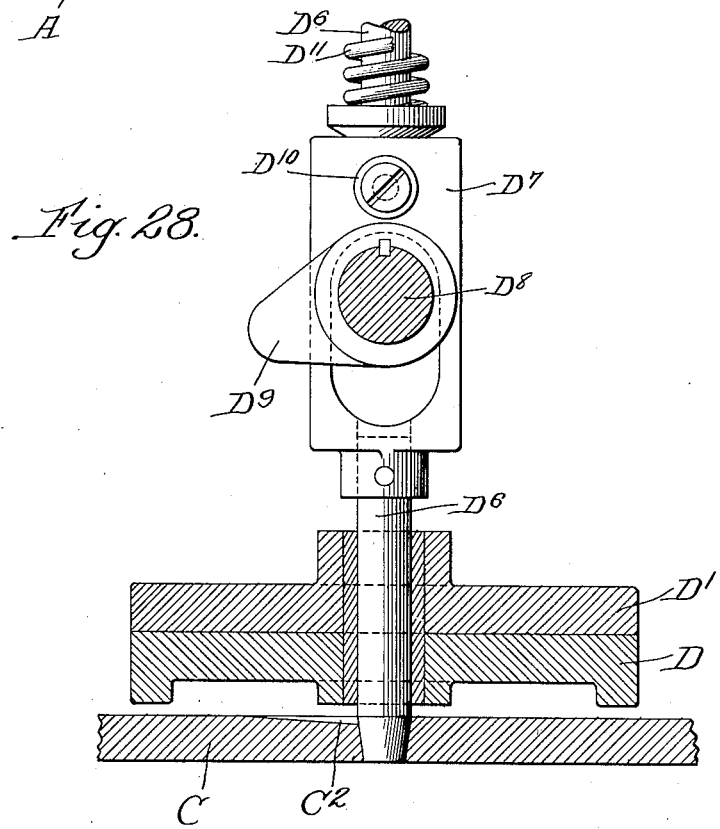
Fig. 28 is a section along the line 28—28 of Fig. 7.

The rotation of the table B carries the pairs of nail knobs successively beneath the bridge D adjacent the slot E, which is formed, as shown in Fig. 26, with a large outward projection $E^1$ concentric with the table B. The blanks are so positioned that their central apertures are directly beneath the slot E. The bridge D adjacent the slot E is provided with a slot $E^2$ along the axis of the bridge, which may be covered as by the plate $E^3$. The washers $E^4$, which may be of any suitable material such as fiber or the like with a central aperture, are fed along this channel by means to be later described, and finally reach a notch $E^5$ in the arm $E^6$ pivoted at $E^7$ to the bridge D, and having secured against rotation with it the dog $E^8$. The washer, when positioned in the notch $E^5$, overlies the slot E and the central aperture of the washer is thus in line with the central apertures of the nail knobs underlying it. Mounted at one end of the dog $E^8$ is the roller $E^9$ adapted to engage and override the cam surfaces $C^1$ about the plate C. The spring $E^{10}$ normally holds the roller $E^9$ in contact with the edge of the plate C. Mounted on the plate C are a plurality of pins $E^{11}$ adapted to underlie or engage the end of the dog $E^8$ opposite the roller $E^9$ when it clears the cam surface $C^1$, to prevent rebound as the roller $E^9$ is thrown against the periphery of the disk C by the spring $E^{10}$. When the washer overlies the pair of nail knobs, a nail is driven through the washer far enough to penetrate both nail knobs and to bring the head of the nail in engagement with the washer. The nails are fed forward by the following mechanism:

F is a nail hopper into which nails are dropped or fed in any preferred manner. Penetrating one side of the hopper is the nail chute $F^1$, comprising a pair of opposed surfaces sufficiently spaced apart to permit the shaft of the nail to penetrate therebetween, the head of the nail riding on the upper surface, as shown in Fig. 19. The bottom of one side of the hopper is slotted to permit the reciprocation of the composite feeding plate, which is adapted to feed nails to the upper end of the chute F¹. This composite member comprises a pair of outer plates F², which are secured against relative motion, and an inner plate F³. The entire assembly is reciprocated, as, for example, by the crank disk F⁵ and the crank arm F⁶, which is pivoted to the plate F³, as at F⁷. The plates F², F² and F³ are normally held against relative movement by the spring F¹², which is compressed between an abutment F⁸ secured to the plate F³ and an abutment F⁹ secured to the plates F². The crank arm normally lifts the entire assembly upwardly until the pin F¹⁰ on the plate F² contacts the adjustable stop bolt F¹¹, whereupon the plates F² are held against further travel and the plate F³ is forced against the spring F¹² upwardly between the plates F². The top of the plate F³ is then lifted to the position shown in Fig. 19 and frees the heads of the nails lying between F² F² and permits them to fall forward, as shown in Fig. 19, against the boss F¹³ overlying the chute F¹. The plate F³ being in alignment with the chute F¹, the nails thus tilted fall forward in line with the chute, and as the plate F³ is withdrawn by further rotation of the crank disk F⁵ the nail drops into the chute F¹ and feeds forward along its downwardly inclined upper face. The flow of nails down the chute F¹ is controlled by a release which permits one nail at a time to pass.

The release mechanism comprises opposed fingers G G, mounted in the arms G¹ of a U- or Y-shaped, oscillating element G² pivoted as at G³ and having a lower arm G⁴, at the lower end of which is a roller G⁵ engaged by the cam drum G⁶ on the shaft X. As the U-shaped element is tilted back and forth the nails are permitted to drop one by one past the fingers G.

The chute F¹ terminates within the upright frame element D⁴ and the nails, as fed forward one by one, drop to position directly over the end of the slot E. When the nail is thus fed, it drops between a pair of opposed guides, one of which is an L-shaped slide H adapted at one position, when taken with the slide H¹, to form a closed hole H² having its upper portion beveled. When each nail drops, these guides are in the position shown in full lines in Fig. 24, and the aperture between them is of such size as to support the nail in substantially vertical position.

Overlying the nail, when thus supported, is the hammer element I, mounted on a sliding head I¹ in the opposed tracks I² mounted on the upright D⁴ of the bracket D¹. This head I¹ is reciprocated by means of the crank disk I³ on the shaft D⁸, and through the crank arm I⁴ which is pivoted as at I⁵ upon the head I¹. The reciprocation of the hammer I drives the nail through the washer and downwardly through the pair of nail knobs therebeneath.

When the nail has thus been driven, the guides H, H¹ are separated, to take the position shown in dotted lines in Fig. 24, by means of the cam disk H³ mounted on the shaft D⁸ and having an enlarged portion, as at H⁴, in contrast to its normally thin portion H⁵. This cam disk is adapted to ride between the opposed rollers H⁶ H⁷ on the guides H and H¹, respectively, which are kept yieldingly against the surface of the cam disk, as, for example, by the springs H⁸ and H⁹ operating against the stop H¹⁰, as shown in Fig. 24. When the thickened portion of the cam disk passes between the rollers H⁶, H⁷ it forces them apart, and thus separates the end portions of H and H¹ to permit the nailed assembly to be carried out through the slot E¹ by the rotation of the table B and the kicking motion of the arm E⁶ against the washer E⁴.

It will be understood that the arm E⁶, during its ejecting movement, travels at the same time and at the same rate as the plate B, the nail knob assembly being still held within the notch B¹⁰.

The assembled nail knob, after the initial nailing stroke just described, is carried forwardly by the table B, being seated in the notch B¹⁰. As the next successive pair of knobs and notch are beneath the hammer, the one just mentioned comes beneath a second hammer J, which is driven by the reciprocation of the head I¹ through a pivot link J¹, to which it is pivotally secured, as at J². The two hammers thus strike in unison. When the assembly reaches a position beneath the hammer J, it comes opposite a second washer feed slot J³, opposite which lies a wheel J⁴ notched as at J⁵ to receive one washer. The wheel J⁴ is driven through the pinion J⁶ and the gear J⁷ from the ring gear C⁴. The notch J⁵ does not penetrate entirely through the wheel J⁴ but has a flat bottom flush with the bottom of the slot J³. Its bottom is penetrated, however, by the slot J⁸ through which the nail may penetrate when driven through by the hammer J over the notch J⁵ and the slot J⁸. When the nail knob assembly is moved to a position over the notch J⁵ it finds beneath it a washer which is fed forward from the slot J³. The hammer then makes its stroke, driving the nail through the second or lower washer, until the bottom of the nail penetrates the slot J⁸ and the upper washer and the head of the nail are in fairly close contact with the top of the upper nail knob, as shown in Figs. 37 to 39, inclusive. Since the wheel J⁴ is driven through the ring gear C⁴ in unison with the table B, it will have a similar step-by-step rotation. When the table B moves, carrying the nail knob assembly forward, the wheel $J^4$ rotates sufficiently to permit the bottom of the nail to clear through the slot $J^8$, and completes one full revolution, allowing another washer to move into the slot in preparation for the next stroke.

Figure 5:
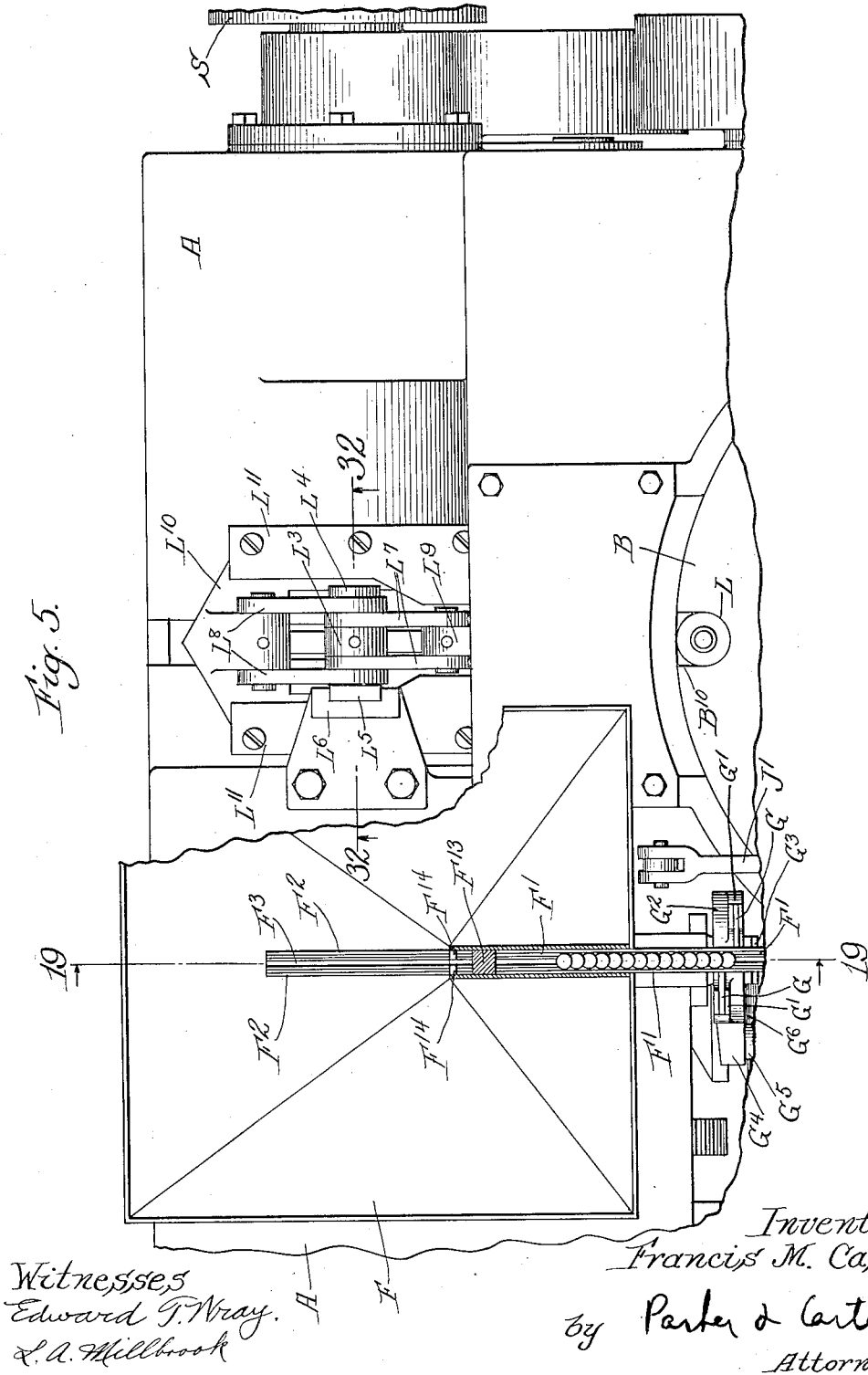

The next step is the crimping of the nail beneath the assembled knobs and washers, and this takes place when the assembly reaches the point marked L in Figs. 1 and 5. The shaft $L^1$, whose driving connection will later be described, has mounted on it an eccentric $L^2$ in rotatable engagement with the eccentric strap $L^3$, the upper end of which is provided with a pin $L^4$ which is secured to a slide $L^5$ adapted for vertical motion along the guide $L^6$. Pivoted to the pin $L^4$ are the links $L^7$ $L^7$ $L^8$ $L^8$, which in turn are pivoted to opposed crimping slides $L^9$ $L^{10}$, $L^9$ being substantially surrounded and guided by $L^{10}$, as illustrated in Figs. 30 and 31. The overlying guide plates $L^{11}$ $L^{11}$ prevent vertical movement of either guide. It will be obvious that as the pin $L^4$ rises and falls the links $L^7$ $L^7$ $L^8$ $L^8$ will alternately draw the crimping slides together and withdraw them. The opposed stops $L^{12}$ $L^{13}$ are provided with slots $L^{14}$ $L^{15}$, which serve as guides for the centering plates $L^{16}$ $L^{17}$, shown in detail in Figs. 33 and 34, and which consist of opposed notched, beveled plates adapted firmly to grasp the shank of the nail. These slides are yieldingly mounted on the main crimping slides and ride on fixed crimping bars $L^{18}$ $L^{18}$ $L^{19}$ $L^{19}$, which are fixed but adjustable by means of the screws $L^{20}$ $L^{21}$. As the crimping slides are drawn together the centering plates grasp the nail and the slides and crimping bars are then forced forward against the resistance of the springs $L^{22}$ $L^{23}$ and contact the nail at either side, as shown in Fig. 35, pressing the opposed ears out on the nail shank. As the shaft $L^1$ is further rotated, the crimping bars and slides are withdrawn and with them the nail centering slides, and the completed assembly is released and carried forward by rotation of the table B.

Figure 8:
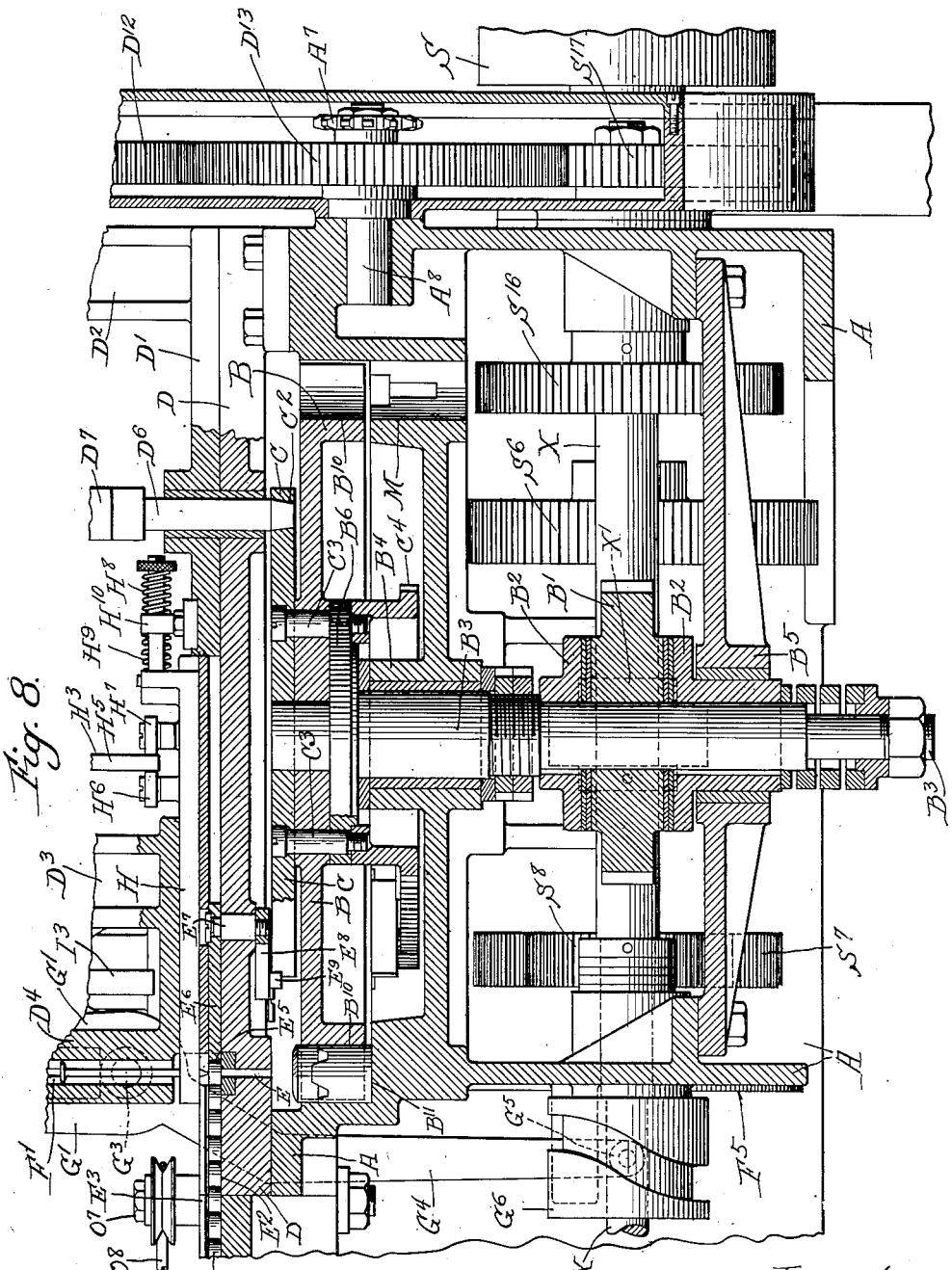
Fig. 8 is a section along the line 7—8 of Fig. 4, showing the lower right-hand portion of the machine.
Figure 9:
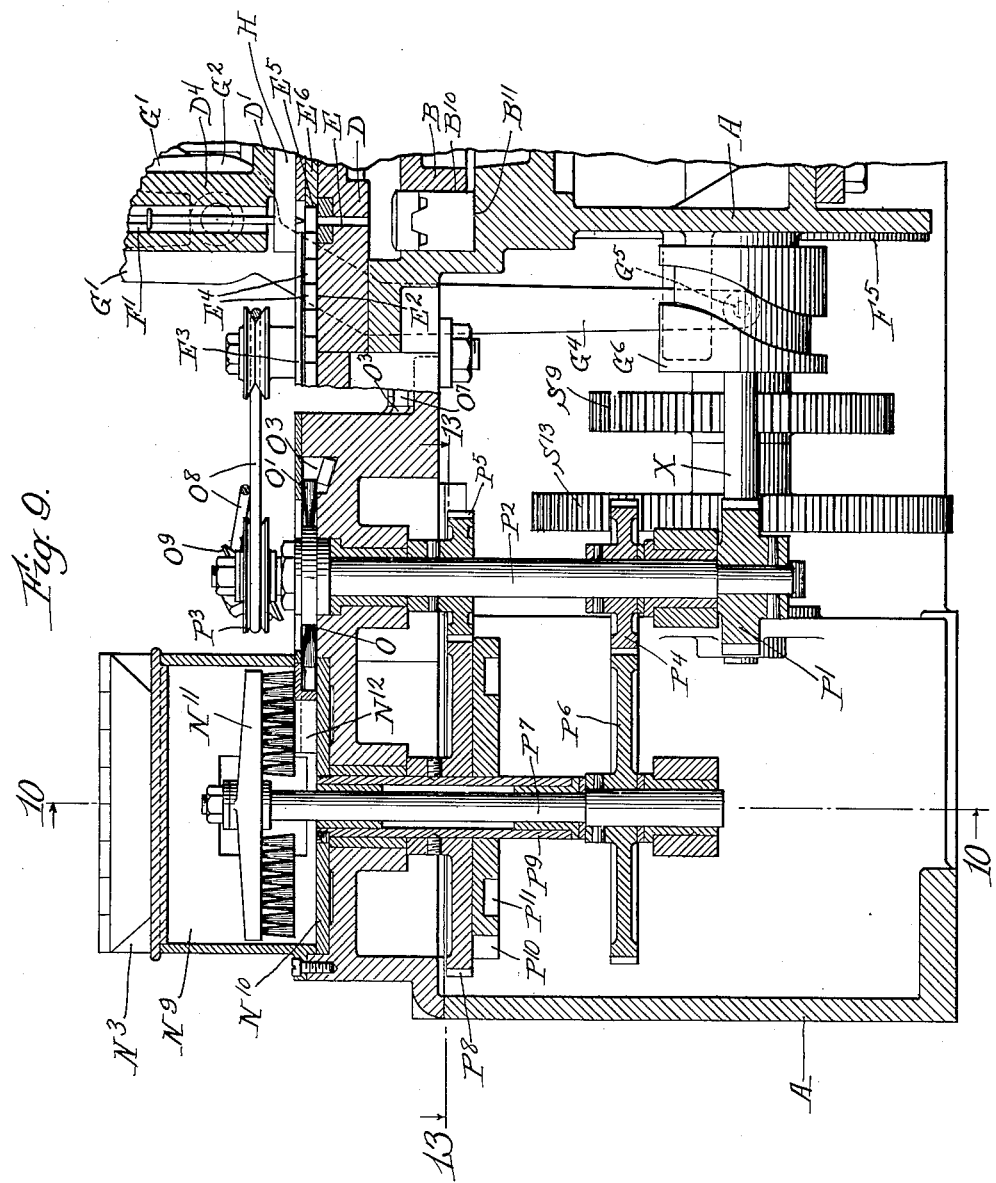
Fig. 9 is a section along the line 9—9 of Fig. 6, showing one end of the machine.

The further rotation of the table B carries the completed assembly over a hole of suitable size in the casting A, for example the hole M shown in Fig. 8, and beneath it may be any suitable receiving or conveying means. Obviously, if desired, the assembled knobs might be picked from the surface of the wheel, but some automatic receiving or conveying means are preferable.

Figure 10:
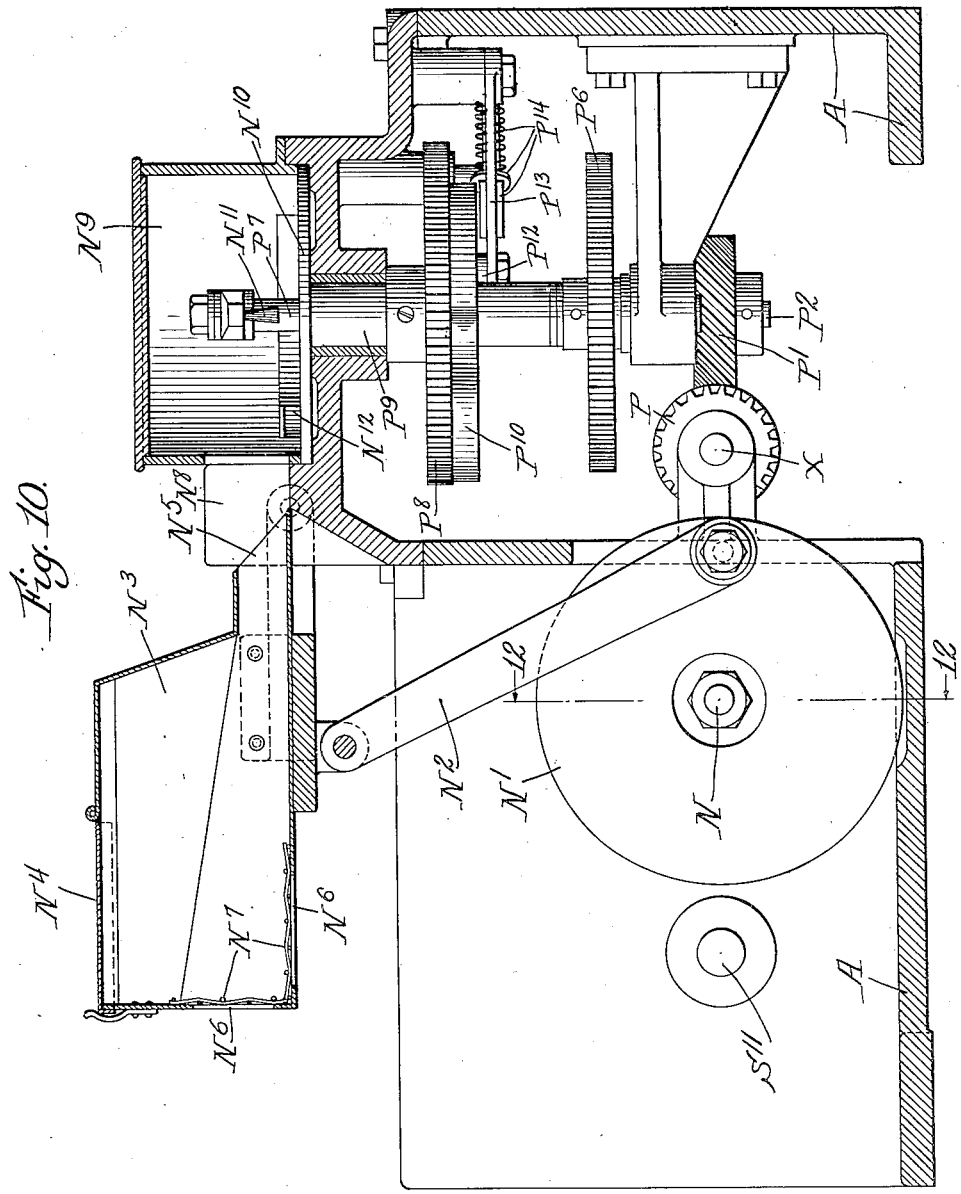
Fig. 10 is a section along the line 10—10 of Figs. 6 and 9.
Figure 11:
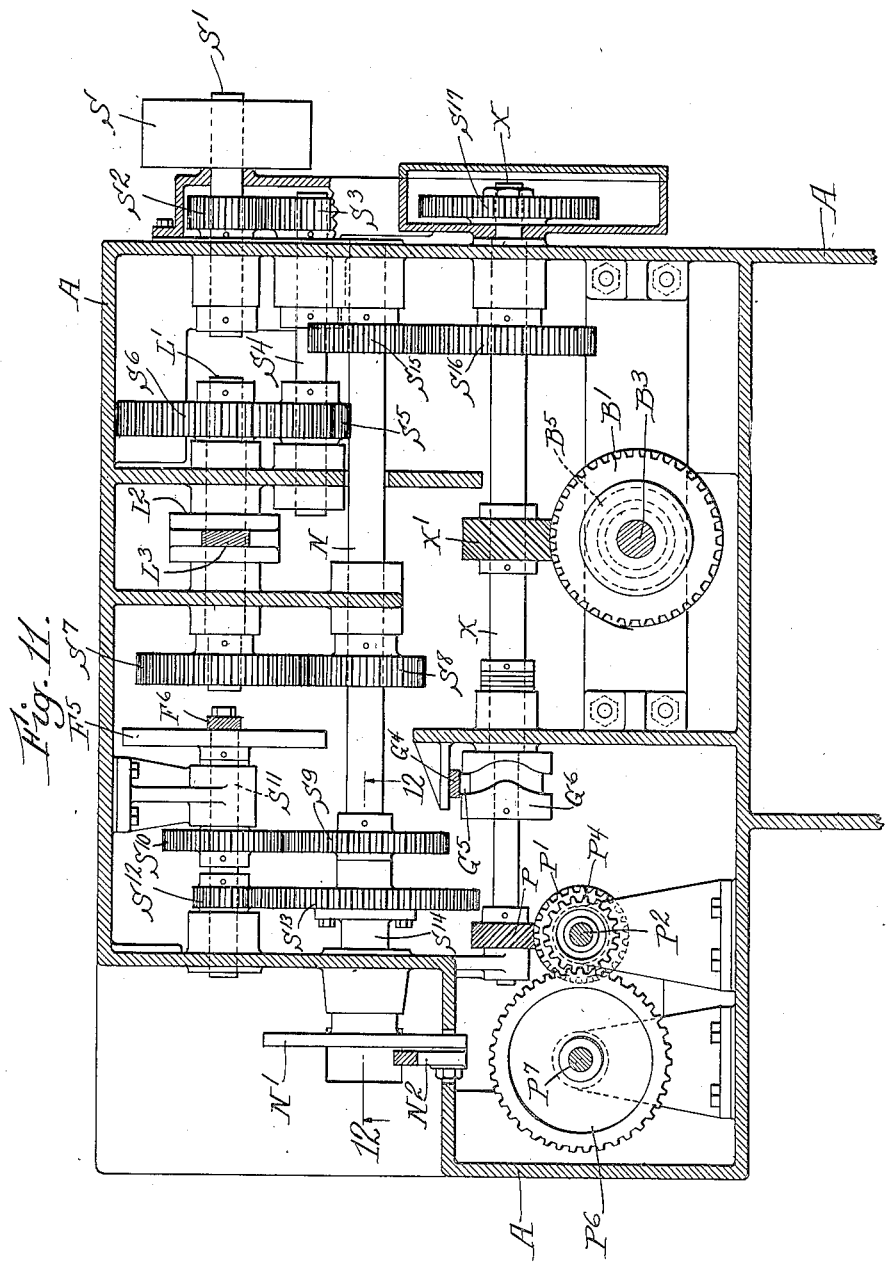
Fig. 11 is a section along the line 11—11 of Fig. 2.
Figure 12:
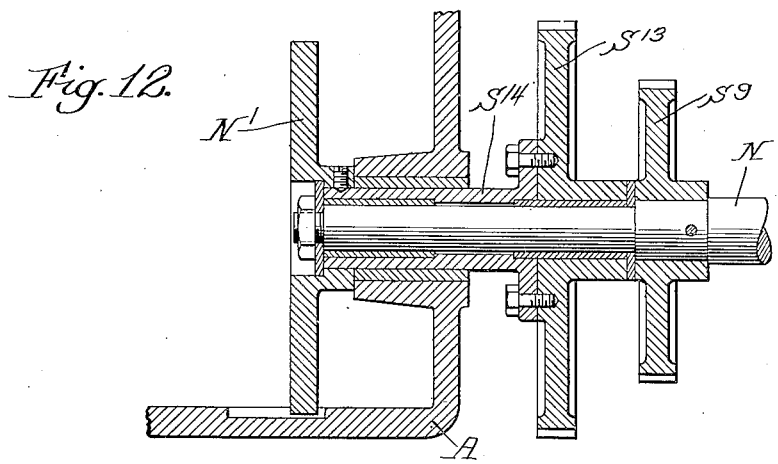
Fig. 12 is a section along the line 12—12 of Figs. 10 and 11.

The means for feeding washers for both hammering operations are as follows: Means, later to be described, are provided for rotating the disk $N^1$, pivoted to which is a crank arm $N^2$ pivoted at its outer end to an oscillating washer feed box $N^3$, which by the constant rotation of the disk $N^1$ is first tilted up and then down from its intermediate position as shown in Fig. 10. The hopper feed box has a hinged cover $N^4$ and a forwardly projecting spout $N^5$, the box being so mounted as to pivot at the end of the spout. The bottom and rear of the box has openings $N^6$ provided with netting $N^7$, and as the box is oscillated small bits and dust are shaken therefrom, keeping the washers in clean, usable condition. As the box is tilted up, it feeds washers forward through the passage $N^8$ into a circular feed box $N^9$, the bottom of which is formed by a constantly rotating disk $N^{10}$ whose driving connection will later be described. Mounted above the rotating plate is a constantly rotating brush $N^{11}$, adapted to rotate faster than the plate $N^{10}$ and adapted to brush the washers about the periphery of the disk and into the peripheral passage or tunnel $N^{12}$.

Figure 6:
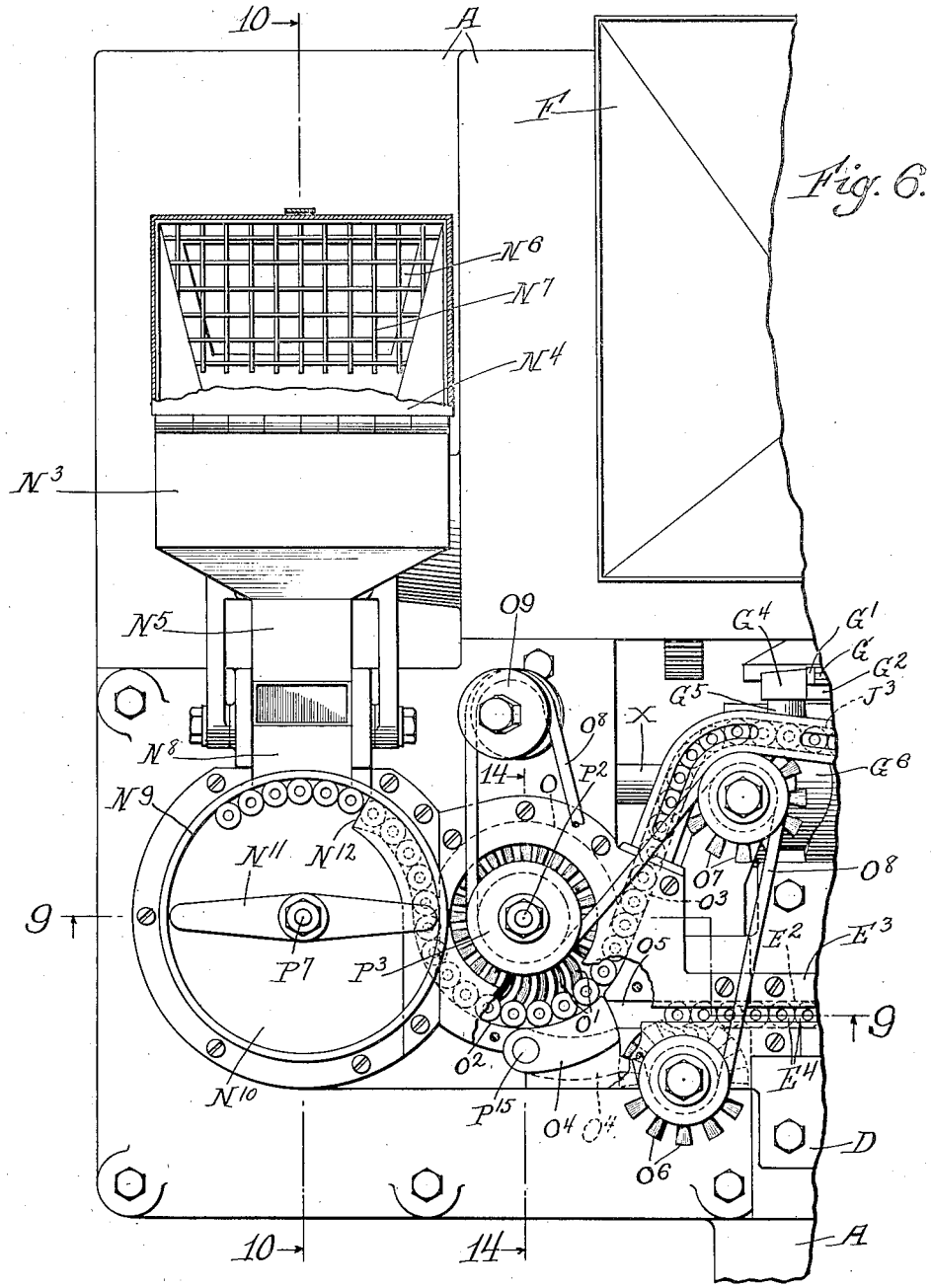
Figure 7:
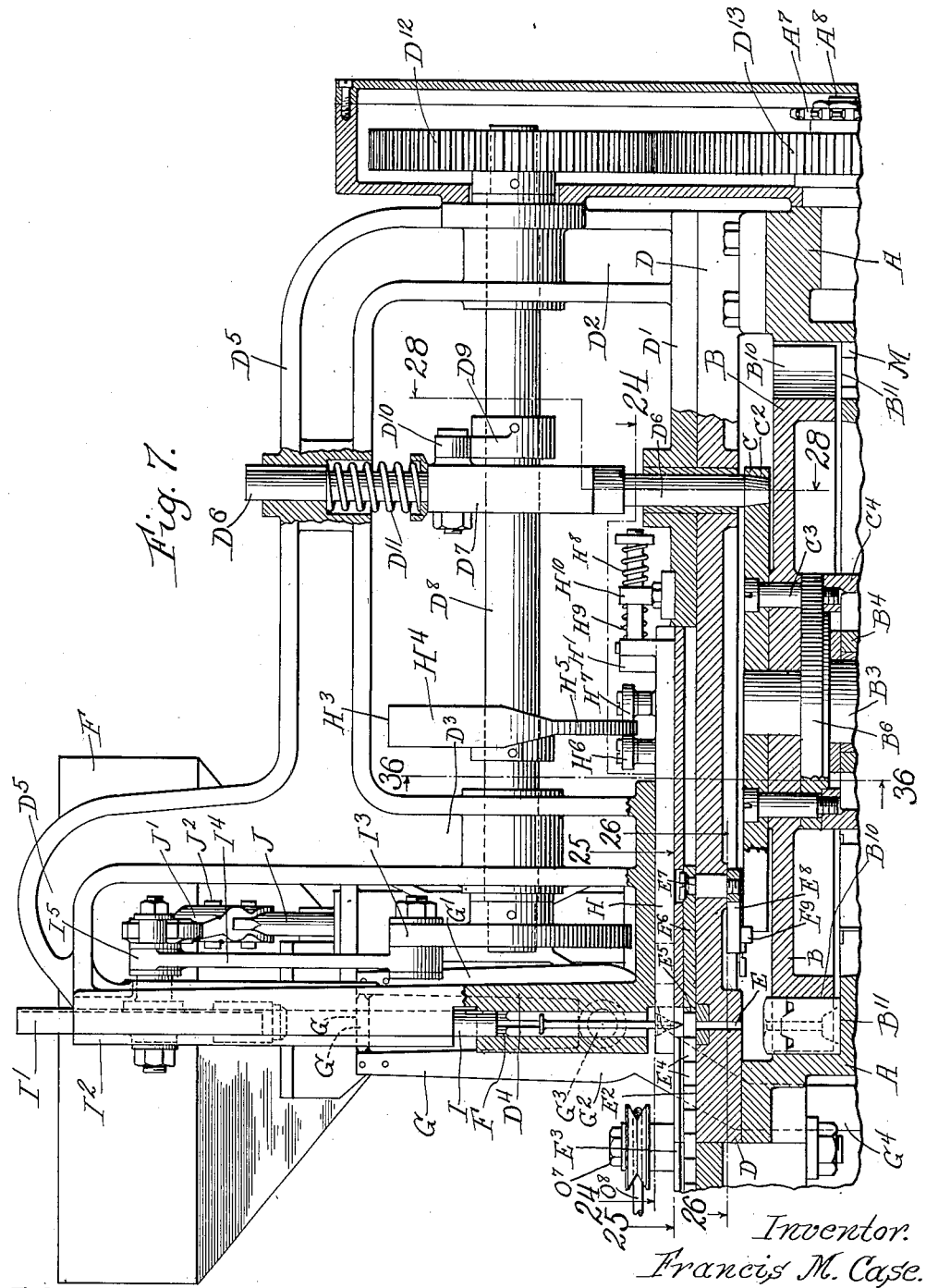
Fig. 7 is a section on the line 7—8 of Fig. 4, with parts in elevation showing the upper part of the machine.
Figure 16:
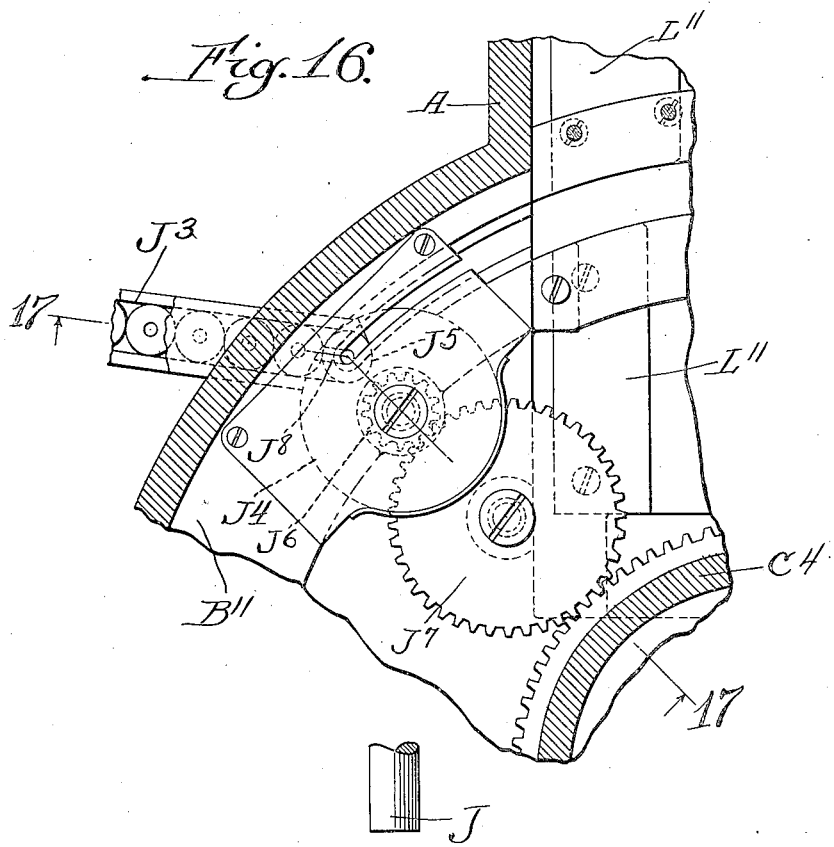
Fig. 16 is a section along the line 16—16 of Fig. 15.
Figure 17:
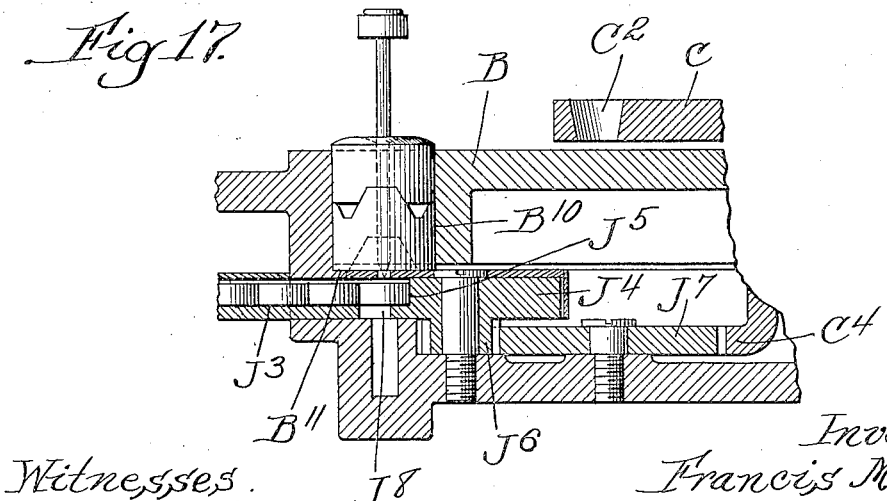
Fig. 17 is a section along the line 17—17 of Fig. 16.

The passage $N^{12}$ leads to a second feed box O, having a fixed bottom but a roughly centrally located, constantly driven rotary brush $O^1$, whose driving connection will later be described. The brush is so spaced in the feed box as to leave space about one side thereof for the passage of a stream of washers, and this space $O^2$ is continued by the passage $O^3$, which terminates in the feed slot $J^3$, which is the bottom washer feed illustrated in Fig. 16. Part of the wall of the passage $O^2$ is formed by a pivoted gate $O^4$. This gate is adapted to be alternately swung from the position shown in full lines in Fig. 6 to the position shown in dotted lines, and when in the latter position the stream of washers is fed forward into the passage $O^5$, which terminates in the upper washer feed slot $E^2$, shown in Fig. 25. Adjacent the passages $O^3$ and $O^5$ are rotary projecting brushes $O^6$ $O^7$, driven from the brush $O^1$, as, for example, by the belt $O^8$ which passes about the tilted idler $O^9$.

Figure 13:
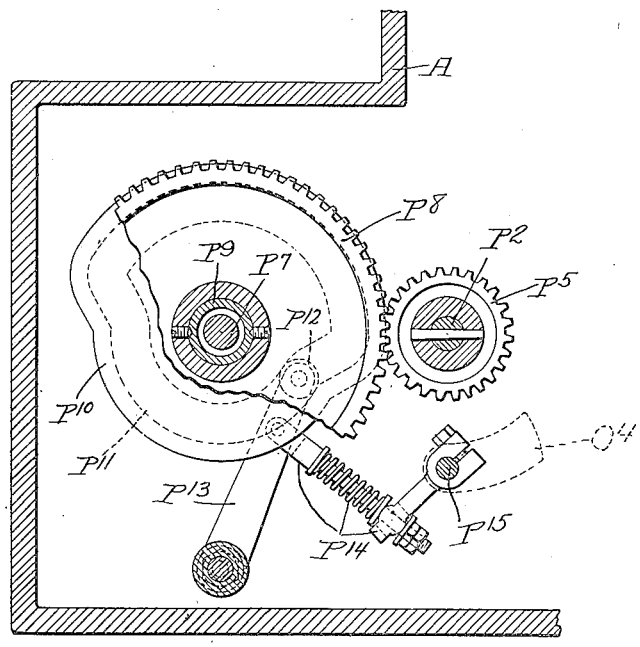
Fig. 13 is a section along the line 13—13 of Fig. 9.

The drive for the various parts of the washer feed is as follows: a helical pinion P on the shaft X meshes with the helical gear $P^1$ on the vertical shaft $P^2$, keyed to the upper end of which shaft is the brush $O^1$. At the upper end of the same shaft is a pulley $P^3$ adapted to drive the belt $O^8$ and the brushes rotated thereby. Intermediate the ends of the shaft $P^2$ are geared the pinions $P^4$ $P^5$. The former drives a gear $P^6$ keyed to the vertical shaft $P^7$, at the upper end of which is the brush $N^{11}$ in the box $N^9$. The pinion $P^5$ meshes with a gear $P^8$ which is secured to a sleeve $P^9$ rotatable about the shaft $P^7$, and which has keyed to its upper end the rotatable plate $N^{10}$. Below, and integral with the gear $P^8$, is a cam disk $P^{10}$, which has a cam slot $P^{11}$ in which rides the roller $P^{12}$ on the pivoted arm $P^{13}$. Pivoted to the arm $P^{13}$ is the flexible connection $P^{14}$, illustrated in Fig. 13, which is adapted to rotate the vertical pin $P^{15}$ which controls the gate $O^4$, as earlier described.

The driving connections for the entire assembly are as follows: The pulley S is constantly driven from any power source, not shown, and rotates with it the shaft $S^1$, which has thereon a gear $S^2$ driving the gear $S^3$ upon the shaft $S^4$, which has on it the gear $S^5$ driving the gear $S^6$ upon the shaft $L^1$, which controls the earlier described crimping eccentric. On the shaft $L^1$ is the gear $S^7$, which drives the pinion $S^8$ on the shaft N. Mounted on the shaft N is the gear $S^9$, which meshes with the gear $S^{10}$ on the shaft $S^{11}$, upon which is mounted the crank disk $F^5$ which operates the nail feed illustrated in Fig. 19. Mounted on the shaft $S^{11}$ is the gear $S^{12}$ in mesh with the gear $S^{13}$, which is mounted upon a sleeve $S^{14}$ adapted to rotate about the shaft N, and which has secured thereto the crank disk $N^1$ which oscillates the washer hopper $N^3$. Mounted on the opposite end of the shaft N is the gear $S^{15}$ in mesh with the gear $S^{16}$ on the shaft X. Intermediate the shaft X is the helical pinion $X^1$ in mesh with the helical gear $B^1$, which drives the table shaft $B^3$. The shaft further carries the cam drum $G^6$, adapted to drive the nail release mechanism by means already described. It also carries at its outer end the helical gear P, in mesh with the helical pinion $P^1$ upon the washer feed shaft $P^2$, the further connections of which have been described above. At the opposite end of the shaft X is the gear $S^{17}$ adapted to drive the gear $D^{13}$ and the sprocket $A^7$, which operates the initial nail knob feed shown in Fig. 3.

Experience has shown that washers might be perforated or solid. If perforated, the perforations would be small enough so that when the nail is driven in, the washer material is expanded and the washer subsequently grips the nail. However, under most conditions, especially when a leather, rubber or fibre washer is used, the washer will not be perforated because the nail will be driven through the washer making its own perforation, and thereby subsequently punching the washer on the nail.

$F^{14}$ $F^{14}$ are parallel fingers, projecting upwardly above the upper edges of the plates $F^2$. These fingers are far enough apart to permit the body of the nail to pass between them, and their height above the upper surface of the plate $F^3$, which is adapted to be engaged by the end of the nail, is slightly less than the distance from the end of the nail to the under side of the head.

The use and operation of my invention are as follows:

In the installation of electric wiring where conduits are not used, it is a common practice to support the wires in pairs on insulating and supporting nail knobs, comprising two separate annular knob elements of glass or porcelain, through which passes a single nail. There is normally an elastic or yielding washer between the head of the nail and the knob for the purpose of cushioning the nail and preventing breakage of the knob, and a holding washer frictionally or otherwise engaging the nail or carried by the nail to hold the two knobs loosely in assembled position so that the operator can take the two knob sections and the nail as a unit, drive the nail part way, lay the wires between the two knobs and tighten up by driving the nail home.

The present invention has to do with a process of forming such nail knob assemblies, and a machine which is particularly adapted to assemble them automatically. The machine as shown takes the nail knobs, arranged in pairs, applies a washer to the top, drives a nail through the washer and through the nail knob, and subsequently drives the nail through a second washer beneath the lower nail knob, and finally crimps the nail shank beneath the knobs and washers. Since the lower washer is in frictional engagement with the shank of the nail, the crimping may, if desired, be dispensed with, or, if the nail is crimped, the lower washer may, if desired, be dispensed with. The upper washer might be dispensed with, but if the knob is of fragile material it is practically indispensable. These various types of assembly are shown in Figs. 37, 38 and 39, and it will be understood that while I have shown mechanism for applying both washers, and for crimping the nail, either action may be dispensed with.

In general, the operation of the machine is as follows: The nail knobs, assembled in interlocking and fitting pairs, are placed on an endless conveyor, which carries them inwardly along a slot or track toward the center of the machine, as shown in Fig. 1. There they contact a carrier plate which has about its periphery a plurality of notches, each of which is substantially equal in diameter to a nail knob. The carrier plate is driven by a constant frictional drive, but its rotation is interrupted at periodic intervals by a stop which penetrates its surface, and thus what amounts to a step-by-step rotation is obtained. At each step one of the notches picks off one of the nail knob pairs and carries it about one step, the remaining nail knobs being forced by frictional contact with the endless conveyor against the periphery of the carrier plate, in readiness to drop into the next slot. As the nail knob pairs are thus carried, the second step of the rotation, as shown in Fig. 1, places them beneath the discharge point of two feeding mechanisms, a washer feed and a nail feed; a chute or slot delivers a washer in a notch in a pivoted arm $E^6$, shown in Fig. 25, in such position that the center of the washer overlies the center of the nail knob pair. The bottom of this notch forms a shelf, apertured to permit the nail to pass therethrough and to pass forward therefrom. Overlying this washer feed is the end of a nail chute which is adapted to drop a nail into an aligning mechanism, comprising two parallel slides, the end of one of which forms a species of L covering the end of the other. The angle of the L and the opposing part is so shaped as to grasp or guide the point or shank of the nail. The two slides reciprocate in timed relation to the movement of the carrier plate, and alternately grasp the nail and release it, the jaws guiding and positioning the nail, but releasing it just before the hammer drives the nail, and opening sufficiently wide to permit the head of the nail and the punch to pass through, thus releasing the nail and permitting the assembly to be carried forward along its journey. The two slides are separated by a cam disk of irregular thickness, which is contacted on either side by rollers, one on each of the slides. When the thickened portion of the disk intervenes between the rollers, the slides are separated and the nail is released.

Figure 25:
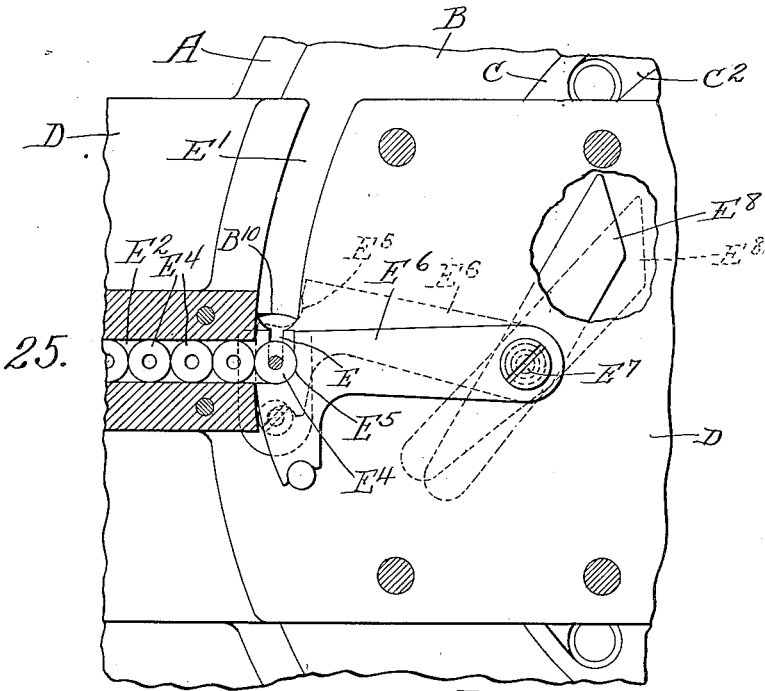
Fig. 25 is a section along the line 25—25 of Fig. 7.

The nails are fed forward along an inclined chute from a nail hopper, and they are fed to this hopper by a plurality of reciprocating plates, three in number. The two side plates have inclined tops in line with the nail chute, and separated by slightly more than the thickness of a nail. The central plate is shorter than the two side plates and its top is normally more than the length of a nail beneath the top of the other two. The entire assembly reciprocates up and down in the bottom of the hopper, and as it rises through the hopper, nails penetrate between the two outside plates and hang suspended along the upper edge. The two side plates are provided with stops which engage a fixed stop along their path of reciprocation, so that at a certain point their reciprocation is checked while the inner plate is forced up between them against the yielding means shown in Fig. 19. The effect of this is to engage the ends of the nails between the two outer plates and to tilt them forward, as shown in Fig. 19, against a stop in the side of the hopper overlying the end of the nail chute and spaced slightly back therefrom. When the plate assembly is withdrawn from the bottom of the hopper, one or two of the nails which have fallen forward against said stop drop into the nail chute and are fed by gravity therealong. Intermediate the ends of this chute a Y-shaped element oscillates, having an inwardly projecting point or needle on each arm of the Y, so spaced that one or the other always crosses the nail chute and prevents passage of the nails. The result is that, when the first needle permits a nail to pass, the second one holds it, and when the second one is withdrawn the first needle is in place blocking the chute. The nails are thus fed forward one by one, and as this reciprocating device is timed to reciprocate with the step by step rotation of the carrier plate one nail is fed forward for each pair of nail knobs as it passes the bottom of the nail chute. When the nail has been fed down the chute and is grasped by the nail guide, and overlies the washer and the nail knob pair, a hammer head, guided in vertical guides and carrying a hammer point, is reciprocated and drives the nail down through the washer and into the nail knobs. The bottom of the nail then rests substantially even with the bottom of the bottom knob and further travel of the nail is prevented by the surface of the casting on which the knob rides. When the hammer has been withdrawn, the carrier plate takes up its rotation and the nail knob assembly is rotated from beneath the hammer and the nail and washer feed, the pivoted arm $E^6$, as shown in Fig. 25, moving the nail and washer until they clear the narrow slot E and drop through the wider slot $E^1$, shown in Fig. 26.

The next step of the rotation of the carrier plate carries the nail knob assembly beneath a second hammer, which is driven in unison with the first. When the assembly reaches a position beneath this hammer, it comes opposite a second washer feed slot, opposite which lies a wheel notched at a single point about its periphery to receive one washer. The washer which penetrates the notch is aligned with the point of the nail. The notch has a flat bottom flush with the bottom of the washer feed slot, but is slotted to permit the nail to penetrate it, and after the hammer stroke the carrier plate rotates and the notched wheel rotates at the same time, the notch or aperture in the bottom being so shaped as to permit the nail to clear. The surface along which the assembly slides is slotted to permit the nail point to depend, so that the carrier plate can continue to convey the assembly around.

The next step of the rotation brings the depending shank of the nail opposite a crimping mechanism. A link action, which has earlier been described, alternately draws two opposed slides together and separates them. Mounted on each slide is a pair of opposed nail-grasping elements, shown as inclined, notched plates. These are yieldingly mounted so that when they have firmly grasped the nail the crimping mechanism connected to them can continue to advance with the rest of the slides. The crimping elements form two opposed pairs of points or shafts, which bite or press out an ear at each side of the nail shank beneath the nail knobs. The opposed slides are then withdrawn and the finished nail knob assembly is released and carried along by the next step of the rotation of the carrier plate. The top of the machine beneath the plate may then be notched or broken at any convenient point, to permit the finished assembly to drop through to any suitable receiving or conveying means, or an operator may pick them out manually and place them on a conveying means, or otherwise dispose of them.

A single washer feeding means suffices to feed washers for both hammering operations. A tilting washer hopper is provided, which tilts up and down and has an open netting at back and bottom to permit dust, waste and broken washers to be shaken out. At each oscillation or tilting a certain number of washers are projected into a circular chamber having rotating bottom, with a brush rotating across the top at a higher rate of speed. This brushes the washers into an opening or tunnel at one side of the chamber, and they pass therethrough to a second feed box which has a fixed bottom and a constantly driven rotary brush whose bristles lie and rotate in a horizontal plane. The brush is so spaced as to feed the washers along one side of the feed box and part of that side is broken by an oscillating gate which directs the flow of washers alternately to passages or chutes leading to one or the other of the washer feeds earlier described. This gate is swung to and fro by a cam action which need not be described in detail, but the result is that each of the washer feed passages is supplied with sufficient washers to keep one always ready for each of the hammering operations.

I have described a nail knob assembly machine in considerable detail, and it is an actually operated machine, but it will be realized that each of the functions herein described might be performed in a variety of ways and the material herein shown is meant to be of an illustrative rather than of a limiting nature.

The machine described is almost entirely mechanical. The pairs of nail knobs may be manually fed to the outer end of the endless conveyor and the assembly need not be touched again until completed and discharged from the machine. This initial feeding operation and the occasional insertion of a supply of washers to the oscillating washer hopper are all the labor that is required to operate the machine, except to supply from time to time a sufficient number of nails to the hopper.

The nail engaging fingers associated with the nail chute are of such length that if nails are working up and down and travel between the plates $F^2$, a nail which is too short will, as its end rides down the cam surface $F^{15}$, fail to clear the ends of the fingers, and the head will be caught by them, thus stopping the feed of nails until the operator removes under-length nails to permit feed to resume. The body of the nails on their way to the machine will be sufficient to permit operation to continue until the operator clears this jam.

It will be understood that in the present specification and claims the term pair or pairs of nail knobs is used to denote an assembly comprising a pair of nail knob elements mounted on or to be mounted on a single nail; the completed nail commercially so called comprises a pair of nail knob elements mounted on a single nail and preferably held permanently in position on said nail.

I claim:

1. In a nail knob assembling machine, a conveying element comprising a disk adapted to rotate about a vertical axis, a supporting element above which said disk rotates, notches spaced about the periphery of said disk, said notches being cut entirely through the disk, and means for giving said disk a step by step rotation, including a stop adapted to penetrate the surface of the disk and means for timing a movement of said stop into and out of engagement with the disk.

2. In a nail knob assembling machine, a hammering mechanism, a conveyor adapted to convey assembled pairs of nail knobs beneath said hammering mechanism, means for feeding a nail to position over each of said nail knob pairs, and means for centering said nail over said pair comprising a pair of opposed nail gripping elements having nail aligning surfaces thereon.

3. In a nail knob assembling machine, a hammering mechanism, a conveyor adapted to convey assembled pairs of nail knobs beneath said hammering mechanism, means for feeding a nail to position over each of said nail knob pairs, and means for centering said nail over said pair, comprising a plurality of sliding elements and opposed nail aligning surfaces thereon.

4. In a nail knob assembling machine, a hammering mechanism, a conveyor adapted to convey assembled pairs of nail knobs beneath said hammering mechanism, means for feeding a nail to position over each of said nail knob pairs, means for centering said nail over said pair, comprising a plurality of sliding elements and opposed nail aligning surfaces thereon, and means for alternately opposing and withdrawing said surfaces to center and release the nail, comprising a cam element and cam stops on each of said slides.

5. In a nail knob assembling machine, a hammering mechanism, a conveyor adapted to convey assembled pairs of nail knobs beneath said hammering mechanism, means for feeding a nail to position over each of said nail knob pairs, and means for centering said nail over said pair, comprising a plurality of sliding elements and opposed nail aligning surfaces thereon and means for alternately opposing and withdrawing said surfaces, comprising a cam disk and opposed cam stops on each of said slides, said cam disk adapted to be rotated between said stops to vary the distance therebetween.

6. In a nail knob assembling machine, a hammering mechanism, a conveyor adapted to convey assembled pairs of nail knobs beneath said hammering mechanism, means for feeding a nail to position over each of said nail knob pairs, means for centering said nail over said pair, comprising a plurality of sliding elements and opposed nail aligning surfaces thereon and means for alternately opposing and withdrawing said surfaces, comprising a cam disk and opposed cam stops on each of said slides, said cam disk adapted to be rotated between said stops to vary the distance therebetween, and yielding means for holding said aligning surfaces normally in opposed operative position.

7. In a nail knob assembling machine, a hammering means, means for feeding assembled pairs of nail knobs successively beneath said hammering means, and means for feeding nails thereabove, comprising a nail hopper, a chute extending downwardly therefrom, and means timed in relation to the feed of the nail knob pairs for releasing nails one by one down said chute, comprising a pair of opposed reciprocating fingers.

8. In a nail knob assembling machine, a hammering means, means for feeding assembled pairs of nail knobs successively beneath said hammering means, and means for feeding nails thereabove, comprising a nail hopper, a chute extending downwardly therefrom, and means timed in relation to the feed of the nail knob pairs for releasing nails one by one down said chute, comprising a pair of opposed reciprocating fingers out of line with each other, their points overlapping.

9. In a nail knob assembling machine, a hammering means, means for feeding assembled pairs of nail knobs successively beneath said hammering means, and means for feeding nails thereabove, comprising a nail hopper, a chute extending downwardly therefrom, and means timed in relation to the feed of the nail knob pairs for releasing nails one by one down said chute, comprising a pair of opposed reciprocating fingers out of line with each other, their points overlapping, and means for reciprocating said points in unison across the chute.

10. In a nailing mechanism, a nail hopper and a supply chute downwardly inclined therefrom, and means for feeding nails to said chute, comprising a reciprocating slide adapted upwardly to reciprocate from the bottom of the hopper, said slide comprising two side elements and a central element, said side elements adapted to pick nails up by their heads, said central member adapted after the conclusion of the upward excursion of the side members to continue its excursion until it contacts the bottoms of the nails suspended between the side members.

11. In a nailing mechanism, a nail hopper and a supply chute downwardly inclined therefrom, and means for feeding nails to said chute, comprising a reciprocating slide adapted upwardly to reciprocate from the bottom of the hopper, said slide comprising two side members and a central member, said side members adapted to pick nails up by their heads, said central member adapted after the conclusion of the upward excursion of the side members to continue its excursion until it contacts the bottoms of the nails suspended between the side members, the upper edges of both side and central members being inclined toward the chute and adapted to tilt nails forwardly toward and into said chute.

12. In a nailing mechanism, a nail hopper and a supply chute downwardly inclined therefrom, and means for feeding nails to said chute, comprising a reciprocating slide adapted upwardly to reciprocate from the bottom of the hopper, said slide comprising two side members and a central member, said side members adapted to pick nails up by their heads, said central member adapted after the conclusion of the upward excursion of the side members to continue its excursion until it contacts the bottoms of the nails suspended between the side members, the upper edges of both side and central members being inclined toward the chute and adapted to tilt nails forwardly toward and into said chute, and a stop above said chute and adapted to limit the fall of nails toward and into said chute.

13. A nail reservoir and means for feeding nails therefrom, comprising a chute downwardly inclined from said reservoir and a reciprocating slide adapted to feed nails to said chute, said slide comprising a plurality of side elements and a central element, the side elements adapted to pick up nails and align them with the chute, means for limiting the upward excursion of the side elements adapted to permit the central element to continue its excursion upwardly against the bottoms of the nails suspended between the side element, to tilt and feed them forwardly into the chute.

14. In a nail knob assembling machine, conveying means adapted to convey assembled pairs of nail knobs, a nail driving means adapted to overlie said knobs at one point in their conveyance, means for feeding and for aligning nails above said nail knobs, and means for feeding washers beneath said nails and above said nail knobs.

15. In a nail knob assembling machine, conveying means adapted to convey assembled pairs of nail knobs, a nail driving means adapted to overlie said knobs at one point in their conveyance, means for feeding and for aligning nails above said nail knobs, and means for feeding washers beneath said nails and above said nail knobs, comprising a washer chute and a washer receiving element at the end thereof adapted to position said washer above the nail knob pair.

16. In a nail knob assembling machine, conveying means adapted to convey assembled pairs of nail knobs, a nail driving means adapted to overlie said knobs at one point in their conveyance, means for feeding and for aligning nails above said nail knobs, and means for feeding washers beneath said nails and above said nail knobs, comprising a washer chute and a washer receiving element at the end thereof adapted to position said washer above the nail knob pair, comprising a notched pivot arm.

17. In a nail knob assembling machine, means for conveying assembled pairs of nail knobs by a step by step rotation, means overlying said nail knob assembling means adapted to position and insert nails therethrough, a washer feeding means adapted to feed washers over said nail knob pairs and beneath said hammering means, a washer receiving and positioning element comprising a notched pivoted arm and means adapted to oscillate said arm in unison with the nail knob conveying means on completion of the hammering operation.

18. In a nail knob assembling machine, means for conveying assembled pairs of nail knobs by a step by step rotation, means overlying said nail knob assembling means adapted to position and insert nails therethrough, a washer feeding means adapted to feed washers over said nail knob pairs and beneath said hammering means, a washer receiving and positioning element comprising a notched pivoted arm and means adapted to oscillate said arm in unison with the nail knob conveying means on completion of the hammering operation, comprising cam stops in connection with the conveying means and pins associated with said pivoted arm and adapted to be engaged by said cam stops.

19. In a nail knob assembling machine, means for conveying assembled pairs of nail knobs by a step by step rotation, means overlying said nail knob assembling means adapted to position and insert nails therethrough, a washer feeding means adapted to feed washers over said nail knob pairs and beneath said hammering means, a washer receiving and positioning element comprising a notched pivoted arm and means adapted to oscillate said arm in unison with the nail knob conveying means on completion of the hammering operation, comprising cam stops in connection with the conveying means and pins associated with said pivoted arm and adapted to be engaged by said cam stops and yielding means for limiting the range of said cam action.

20. In a nail knob assembling machine, means for conveying assembled pairs of nail knobs by a step by step rotation, means overlying said nail knob assembling means adapted to position and insert nails therethrough, a washer feeding means adapted to feed washers over said nail knob pairs and beneath said hammering means, a washer receiving and positioning element comprising a notched pivoted arm and means adapted to oscillate said arm in unison with the nail knob conveying means on completion of the hammering operation, comprising cam stops in connection with the conveying means and pins associated with said pivoted arm and adapted to be engaged by said cam stops and yielding means for limiting the range of said cam action, comprising a leaf spring adapted to return the pivoted arm in the opposite direction.

21. In a nail driving device, washer feeding means comprising in part a washer-containing box and means for tilting it about a horizontal axis, a discharge passage from said box, the sides of said box being apertured, a network in said apertures.

22. In a nail driving machine, a washer feed mechanism comprising in part a washer hopper and means for feeding washers therefrom upon a rotating plate, a brush adapted to rotate about said plate with a different rate of rotation than the plate, an escape passage from the periphery of said plate, and a plurality of feeding brushes, said escape passage adapted to circle about said rotating brushes.

23. In a nail driving device, washer feeding means comprising in part a washer-containing box and means for tilting it about a horizontal axis, a discharge passage from said box, the sides of said box being openly apertured, a network in said apertures, a feed passage and means for supplying washers thereto, and conveying means intermediate the ends of said passage comprising rotating brushes.

24. A washer feed mechanism comprising a washer supporting rotating plate, a chute opening adjacent the periphery thereof, and an overlying rotary brush.

25. A washer feed mechanism comprising a washer supporting rotating plate, a chute opening adjacent the periphery thereof, an overlying rotary brush, and means for rotating it more rapidly than but in the same direction as the rotating plate.

26. In a nail knob assembling machine, a plurality of washer supply chutes adapted to supply washers at different points along the excursion of the nail knobs, a single washer supply source therefor, and means for feeding washers from said source alternately into said chutes.

27. In a nail knob assembling machine, a plurality of washer supply chutes adapted to supply washers at different points along the excursion of the nail knobs, a single washer supply source therefor, and means for feeding washers from said source alternately into said chutes, comprising a pivot gate.

28. In a nail knob assembling machine, a plurality of washer supply chutes adapted to supply washers at different points along the excursion of the nail knobs, a single washer supply source therefor, and means for feeding washers from said source alternately into said chutes, comprising a pivot gate closing one of said passages and means for opening it, a rotary brush adjacent said gate and adapted normally to feed washers along one of said passages and adapted when said gate is opened to feed to the other of said passages.

29. In a nail knob assembling machine, a plurality of washer supply chutes adapted to supply washers at different points along the excursion of the nail knobs, a single washer supply source therefor, and means for feeding washers from said source alternately into said chutes, comprising a pivot gate closing one of said passages and means for opening it, a rotary brush adjacent said gate and adapted normally to feed washers along one of said passages and adapted when said gate is opened to feed to the other of said passages, said passages being tangential to said brush.

30. In a nail knob assembling machine, a plurality of washer supply chutes adapted to supply washers at different points along the excursion of the nail knobs, a single washer supply source therefor, and means for feeding washers from said source alternately into said chutes, comprising a pivoted gate and an actuating cam therefor.

31. In a nail knob assembling machine, a chute adapted to convey flat objects along a substantially horizontal plane and means for conveying said objects therealong comprising a rotary radially bristled brush rotatable about a substantially vertical axis, a portion of said chute being substantially tangent to the periphery of said brush.

32. In a nail knob assembling machine, a chute adapted to convey flat objects along a substantially horizontal plane and means for conveying said objects therealong comprising a rotary radially bristled brush rotatable about a substantially vertical axis, a portion of said chute being substantially tangent to the periphery of said brush, the periphery of said brush being adapted to engage the objects passing through said chute.

33. In a nail knob assembling machine, means for feeding assembled pairs of nail knobs in spaced relation through said machine, nail feed means, a plurality of hammering means adapted to drive nails through said pairs at separate points in the course of their travel through said machine, and means for actuating said hammering means simultaneously.

34. In a nail knob assembling machine, means for feeding assembled pairs of nail knobs in spaced relation through said machine, nail feed means, a plurality of hammering means adapted to drive nails through said pairs at separate points in the course of their travel through said machine, and means for actuating said hammering means simultaneously and in timed relation with the passage of said pairs through the machine.

35. In a nail knob assembling machine, means for feeding assembled pairs of nail knobs in spaced relation through said machine, nail feed means, a plurality of hammering means adapted to drive nails through said pairs at separate points in the course of their travel through said machine, and means for actuating said hammering means simultaneously and in timed relation with the passage of said pairs through the machine, comprising a plurality of hammer heads, guides therefor, means for reciprocating one of said hammer heads along said guides and a lever arm adapted to be actuated thereby to reciprocate the second hammer head.

36. In a nail knob assembling machine, means for conveying nail knob pairs to said machine, a supply passage adapted to feed washers beneath said pair, means for passing a nail through said pair and through said underlying washer, and aligning means for said washer.

37. In a nail knob assembling machine, means for conveying nail knob pairs to said machine, a supply passage adapted to feed washers beneath said pair, means for passing a nail through said pair and through said underlying washer, and aligning means for said washer comprising a notched disk.

38. In a nail knob assembling machine, means for conveying nail knob pairs to said machine, a supply passage adapted to feed washers beneath said pair, means for passing a nail through said pair and through said underlying washer, and aligning means for said washer comprising a notched disk, the bottom of said notch being perforated.

39. In a nail knob assembling machine, means for conveying assembled pairs of nail knobs therethrough, means for positioning a washer over each pair of nail knobs at one point in its travel, means for driving a nail therethrough and into the nail knobs, means for placing a washer beneath each pair of nail knobs, and means for driving the nail through said additional washer.

40. In a nail knob assembling machine, means for conveying assembled pairs of nail knobs therethrough, means for positioning a washer over each pair of nail knobs at one point in its travel, means for driving a nail therethrough and into the nail knobs, means for placing a washer beneath each pair of nail knobs, and means for driving the nail through said additional washer, said driving means adapted to be actuated in unison.

41. In a nail knob assembling machine, means for conveying assembled pairs of nail knobs therethrough, means for positioning a washer over each pair of nail knobs at one point in its travel, means for driving a nail therethrough and into the nail knobs, means for placing a washer beneath each pair of nail knobs, and means for driving the nail through said additional washer, and means for enlarging the stem of the nail beneath said last mentioned washer.

42. In a nail knob assembling machine, means for conveying assembled pairs of nail knobs therethrough, means for positioning a washer over each pair of nail knobs at one point in its travel, means for driving a nail therethrough and into the nail knobs, means for placing a washer beneath each pair of nail knobs, means for driving the nail through said additional washer, said driving means adapted to be actuated in unison, and means for enlarging the stem of the nail beneath said last mentioned washer.

43. In a nail knob assembling machine, means for crimping the nail stems, comprising opposed crimping elements and slides therefor and means for actuating said slides alternately to and away from each other, comprising links connecting said slides and means for alternately aligning and inclining said links.

44. In a nail knob assembling machine, means for crimping the nail stems, comprising opposed crimping elements and slides therefor and means for actuating said slides alternately to and away from each other, comprising links connecting said slides and means for alternately aligning and inclining said links, comprising a connection between said links and an eccentric connected thereto.

45. In a nail knob assembling machine, means for crimping the nail stems, comprising opposed crimping elements and slides therefor and means for actuating said slides alternately to and away from each other, comprising links connecting said slides and means for alternately aligning and inclining said links, comprising a connection between said links and an eccentric connected thereto, and guiding means therefor.

46. In a nail knob assembling machine, a pair of opposed crimping elements and slides therefor, the crimping elements being fixed on said slides, and nail grasping and aligning means yieldingly mounted upon said slides.

47. In a nail knob assembling machine, a pair of opposed crimping elements and slides therefor, the crimping elements being fixed on said slides, and nail grasping and aligning means associated with said slides, each comprising a notched blade.

48. In a nail knob assembling machine, a conveyor adapted to convey assembled pairs of nail knobs beneath a hammering mechanism, means for feeding a nail to position over each of said nail knob pairs, and means for centering said nail over said pair, comprising a plurality of sliding elements and opposed nail aligning surfaces thereon and means for alternately opposing and withdrawing said surfaces, comprising a cam disk of varying thickness and opposed cam stops on each of said slides, said cam disk adapted to be rotated between said stops to vary the distance therebetween.

49. In a nail knob assembling machine, a conveyor adapted to convey assembled pairs of nail knobs beneath a hammering mechanism, means for feeding a nail to position over each of said nail knob pairs, means for centering said nail over said pair, comprising a plurality of sliding elements and opposed nail aligning surfaces thereon and means for alternately opposing and withdrawing said surfaces, comprising a cam disk of varying thickness and opposed cam stops on each of said slides, said cam disk adapted to be rotated between said stops to vary the distance therebetween, and yielding means for holding said aligning surfaces normally in opposed operative position.

50. In a nail feeding machine, a nail feed comprising a nail hopper, a chute downwardly projecting therefrom, the top of said chute being above the top of said hopper, and means adapted to lift nails to said chute and to tilt them forward therein.

51. In a nail feeding machine, a nail feed comprising a nail hopper, a chute downwardly projecting therefrom, the top of said chute being above the top of said hopper, and means adapted to lift nails to said chute and to tilt them forward therein, and a stop adjacent the upper end of the chute adapted to receive the head of the nail as it is tilted forward.

52. In a nail knob assembling machine, a plurality of washer supply chutes adapted to supply washers at different points along the excursion of the nail knobs, a single washer supply source therefor, and means for feeding washers from said source into said chutes.

53. In a nail knob assembling machine, means for feeding nail knob pairs in spaced relation through said machine, a plurality of hammering means adapted to operate successively on each pair of nail knobs at separate points in the course of their travel through said machine, and means for simultaneously actuating said hammering means.

54. In a nail knob assembling machine, means for conveying assembled pairs of nail knobs therethrough, means for positioning a washer over each pair of nail knobs at one point in its travel, means for driving a nail therethrough and into the nail knobs, means for placing a washer at another point in the travel beneath each pair of nail knobs, and means for subsequently driving the nail through said additional washer, and means for enlarging the stem of the nail beneath said last mentioned washer.

55. In a nail knob assembling machine, means for conveying assembled pairs of nail knobs therethrough, means for positioning a washer over each pair of nail knobs at one point in its travel, means for driving a nail therethrough and into the nail knobs, means for placing a washer at another point in the travel beneath each pair of nail knobs, means for subsequently driving the nail through said additional washer, said driving means adapted to be actuated in unison, and means for enlarging the stem of the nail beneath said last mentioned washer.

56. In a nail knob assembling machine, means for conveying nail knob pairs to said machine, a supply passage adapted to feed washers beneath said pair, means for passing a nail through said pair and through said underlying washer, aligning means for said washer comprising a singly notched disk, the bottom of said notch being perforated, and means for rotating said notched disk in unison with the conveying means, the relation of drive and size of the notched disk being such that its notch lies beneath each nail knob assembly as it passes thereover.

57. In a nail feeding machine, means for sorting loosely massed nails, comprising a vertically reciprocating chute having inclined walls and bottom, and means associated therewith for preventing discharge through said chute of any nail shorter than a predetermined minimum.

58. In a nail feeding machine, means for sorting loosely massed nails, comprising a vertically reciprocating chute having inclined walls and bottom, and means associated therewith for preventing discharge through said chute of any nail shorter than a predetermined minimum, said means comprising a gate wide enough to permit the passage of the body of a nail, but too narrow to permit the passage of the head, the height of the gate being substantially equal to the distance from point to bottom of the head of the shortest permissible nail.

59. In a nail feeding machine, means for sorting loosely massed nails, comprising a vertically reciprocating chute having inclined walls and bottom, means associated therewith for preventing discharge through said chute of any nail shorter than a predetermined minimum, a fixed chute adapted to receive nails discharged from the reciprocating chute, and a stop adjacent the path of the reciprocating chute, adapted to control the discharge of successive nails from the reciprocating to the fixed chute at the end of each downward excursion of the former chute.

60. In a nail feeding machine, means for sorting loosely massed nails, comprising a vertically reciprocating chute having inclined walls and bottom, means associated therewith for preventing discharge through said chute of any nail shorter than a predetermined minimum, said means comprising a gate wide enough to permit the passage of the body of a nail, but too narrow to permit the passage of the head, the height of the gate being substantially equal to the distance from point to bottom of the head of the shortest permissible nail, a fixed chute adapted to receive nails discharged from the reciprocating chute, and a stop adjacent the path of the reciprocating chute, adapted to control the discharge of successive nails from the reciprocating to the fixed chute at the end of each downward excursion of the former chute.

61. In a nail feeding machine, means for sorting loosely massed nails, comprising a vertically reciprocating chute having inclined walls and bottom, and means associated therewith for preventing discharge through said chute of any nail shorter than a predetermined minimum, said means comprising a pair of fingers, one on either side of the chute, projecting upwardly from the bottom wall thereof a distance less than the length of the minimum nail measured from the point to the under side of the head, the distance between the fingers being less than the diameter of the nail head.

62. In a nail feeding machine, a nail feed comprising a nail hopper, a chute downwardly projecting therefrom, the top of said chute being above the bottom of said hopper, means for feeding nails to said chute comprising a reciprocating slide, and means associated with the chute for preventing the downward movement therealong of any nail shorter than a predetermined minimum.

63. In a nail feeding machine, a nail feed comprising a nail hopper, a chute downwardly projecting therefrom, the top of said chute being above the bottom of said hopper, means for feeding nails to said chute, comprising a reciprocating slide adapted to lift nails from the bottom of the hopper and feed them to said chute, and means associated with the chute for preventing the downward movement therealong of any nail shorter than a predetermined minimum.

64. In a nail feeding machine, a nail feed comprising a nail hopper, a chute downwardly projecting therefrom, the top of said chute being above the bottom of said hopper, means for feeding nails to said chute comprising a reciprocating slide of substantially the same cross section as the chute, means for reciprocating it from the bottom of the hopper to a position above the chute, and means associated with the chute for preventing the downward movement therealong of any nail shorter than a predetermined minimum.

65. In a nail feeding machine, a nail feed comprising a nail hopper, a chute downwardly projecting therefrom, the top of said chute being above the bottom of said hopper, means for feeding nails to said chute comprising a reciprocating slide, and means associated with the chute for preventing the downward movement therealong of any nail shorter than a predetermined minimum, said means comprising fingers projecting upwardly from the bottom of the chute a distance substantially equal to the distance from the under side of the head to the point of the shortest permissible nail and spaced apart less than the diameter of the nail head.

66. In a nail feeding machine, a nail feed comprising a nail hopper, a chute downwardly projecting therefrom, the top of said chute being above the bottom of said hopper, means for feeding nails to said chute, comprising a reciprocating slide adapted to lift nails from the bottom of the hopper and feed them to said chute, and means associated with the chute for preventing the downward movement therealong of any nail shorter than a predetermined minimum, said means comprising fingers projecting upwardly from the bottom of the chute a distance substantially equal to the distance from the under side of the head to the point of the shortest permissible nail and spaced apart less than the diameter of the nail head.

67. In a nail feeding machine, a nail feed comprising a nail hopper, a chute downwardly projecting therefrom, the top of said chute being above the bottom of said hopper, means for feeding nails to said chute, comprising a reciprocating slide of substantially the same cross section as the chute, means for reciprocating it from the bottom of the hopper to a position above the chute, means associated with the chute for preventing the downward movement therealong of any nail shorter than a predetermined minimum, said means comprising fingers projecting upwardly from the bottom of the chute a distance substantially equal to the distance from the under side of the head to the point of the shortest permissible nail and spaced apart less than the diameter of the nail head.

68. In a nail knob assembly machine means for conveying a succession of assembled pairs of nail knobs through said machine, means for feeding and aligning a washer over the aperture of each pair of nail knobs, means for feeding and aligning a washer beneath the aperture of each pair of nail knobs, means for feeding and for aligning a nail over the aperture of each pair of nail knobs and means for driving said nail through said nail knobs and washers.

69. In a nail knob assembly machine, means for conveying a succession of assembled pairs of nail knobs through said machine, means for feeding and aligning a washer over the aperture of each pair of nail knobs, means for feeding and aligning a washer beneath the aperture of each pair of nail knobs, means for feeding and for aligning a nail over the aperture of each pair of nail knobs and means for driving said nail through said nail knobs and washers, and means for crimping said nail beneath said nail knobs and washers.

70. In a nail knob assembly machine means for conveying a succession of assembled pairs of nail knobs through said machine, means for feeding and aligning a washer over the aperture of each pair of nail knobs, means for feeding and for aligning a nail over the aperture of each pair of nail knobs and means for driving said nail through said nail knobs and washers.

71. In a nail knob assembly machine, means for conveying a succession of assembled pairs of nail knobs through said machine, means for feeding and aligning a washer over the aperture of each pair of nail knobs, means for feeding and aligning a nail over the aperture of each pair of nail knobs and means for driving said nail through said nail knobs and washers, and means for crimping said nail beneath said nail knobs and washers.

72. In a nail knob assembling machine, a pair of opposed crimping elements and slides therefor, the crimping elements being fixed on said slides, and nail grasping and aligning means associated with said slides, each comprising a notched blade, the ends of said blades projecting beyond the ends of the crimping elements, and overlapping each other.

73. In a nail knob assembling machine, means for conveying a succession of assembled pairs of nail knobs through said machine, means for feeding a washer to and for aligning it with the aperture of each pair of nail knobs, means for feeding and for aligning a nail with the aperture of each pair of nail knobs, and means for driving the nail through said nail knobs and washers.

74. In a nail knob assembling machine, means for conveying a succession of assembled pairs of nail knobs through said machine, means for feeding and aligning a washer above the aperture of each pair of nail knobs, means for feeding and for aligning a nail over the aperture of each pair of nail knobs, and means for driving said nail through said nail knobs and washers.

75. In a nail knob assembling machine, means for conveying a succession of assembled pairs of nail knobs through said machine, means for feeding and aligning a washer beneath the aperture of each pair of nail knobs, means for feeding and for aligning a nail over the aperture of each pair of nail knobs, and means for driving said nail through said nail knobs and washers.

Signed at Cleveland, county of Cuyahoga, and State of Ohio, this 7th day of April, 1922.

FRANCIS M. CASE.